United States Patent
Takakuwa et al.

(10) Patent No.: US 8,081,871 B2
(45) Date of Patent: Dec. 20, 2011

(54) INFORMATION RECORDING MEDIUM, INFORMATION RECORDING APPARATUS AND METHOD, INFORMATION REPRODUCING APPARATUS AND METHOD, AND COMPUTER PROGRAM FOR RECORD OR REPRODUCTION CONTROL

(75) Inventors: Nobuyuki Takakuwa, Saitama (JP); Yasuko Fukuda, Saitama (JP); Takao Sawabe, Saitama (JP); Tohru Kanegae, Saitama (JP); Masanori Nakahara, Saitama (JP); Takeshi Koda, Saitama (JP)

(73) Assignee: Pioneer Corporation, Tokyo (JP)

( * ) Notice: Subject to any disclaimer, the term of this patent is extended or adjusted under 35 U.S.C. 154(b) by 1596 days.

(21) Appl. No.: 10/548,467

(22) PCT Filed: Feb. 25, 2004

(86) PCT No.: PCT/JP2004/002196
§ 371 (c)(1),
(2), (4) Date: Jun. 7, 2006

(87) PCT Pub. No.: WO2004/082272
PCT Pub. Date: Sep. 23, 2004

(65) Prior Publication Data
US 2006/0250908 A1    Nov. 9, 2006

(30) Foreign Application Priority Data

Mar. 10, 2003  (JP) .................................. 2003-063466

(51) Int. Cl.
*H04N 5/76* (2006.01)
(52) U.S. Cl. ........................................................ 386/341
(58) Field of Classification Search ................... 386/94, 386/95, 108, 124–126, 239, 241
See application file for complete search history.

(56) References Cited

U.S. PATENT DOCUMENTS

| | | | | |
|---|---|---|---|---|
| 5,923,627 A | * | 7/1999 | Miwa et al. | 386/70 |
| 5,999,696 A | * | 12/1999 | Tsuga et al. | 386/98 |
| 5,999,698 A | * | 12/1999 | Nakai et al. | 386/230 |
| 6,480,666 B1 | * | 11/2002 | Wilson et al. | 386/70 |
| 6,907,190 B2 | * | 6/2005 | Kashiwagi et al. | 386/125 |
| 6,954,419 B1 | * | 10/2005 | Kimura et al. | 369/275.3 |
| 7,079,752 B1 | * | 7/2006 | Leyendecker | 386/94 |
| 7,356,247 B2 | * | 4/2008 | Hamasaka et al. | 386/248 |
| 7,606,474 B2 | * | 10/2009 | Fukuda et al. | 386/126 |
| 7,826,720 B2 | * | 11/2010 | Seo et al. | 386/334 |
| 7,869,690 B2 | * | 1/2011 | Kato | 386/241 |
| 2003/0026597 A1 | * | 2/2003 | Cho et al. | 386/111 |
| 2004/0175111 A1 | * | 9/2004 | Jung et al. | 386/69 |

FOREIGN PATENT DOCUMENTS

| | | |
|---|---|---|
| JP | 2000-100137 | 4/2000 |
| JP | 2003-087740 | 3/2003 |
| JP | 2003-199047 | 7/2003 |

* cited by examiner

*Primary Examiner* — David Harvey
(74) *Attorney, Agent, or Firm* — Young & Thompson

(57) ABSTRACT

An information recording medium on which a plurality of stream groups are multiplexed and recorded by a unit of packet, which is a physically accessible unit, each of the stream groups including one video stream, the information recording medium provided with: an object data file for storing object data which comprises a plurality of packets; and an object information file for storing correspondence definition information for controlling the reproduction of the object data. The object data is divided by a divisional unit in at least one portion of a reproduction section, which is provided with the plurality of packets and corresponds to one of the plurality of stream groups. The object information file stores unit address information indicating an address of each of divisional units, as the reproduction control information.

9 Claims, 21 Drawing Sheets (a)

(b)

| | Program Map PID | Program No. | Content of ES | ES_PID |
|---|---|---|---|---|
| show1 | 100 | 1 | Video 1 | 101 |
| | | | Video 2 | 102 |
| | | | Audio 1 | 103 |
| show2 | | | Audio 2 | 104 |
| | 200 | 2 | Video 3 | 201 |
| | | | Audio 3 | 202 |

※Shows 1, 2 represent Channels in Broadcasting

PAT & PMT of TS#1 Object:

| Disc | | 100 |
|---|---|---|
| Title #1 | | 200 |
| P List #1 | | 126 |
| Item #1 | | 204 |
| Vision#1 | Video 1 | }  One PG, VOB |
| | Audio 1 | |
| | Audio 2 | |
| Vision#2 | Video 2 | }  One PG, VOB |
| | Audio 1 | |
| | Audio 2 | |
| Vision#3 | Video 3 | }  One PG, VOB |
| | Audio 3 | |

FIG. 13

Disc Info. File: 112

| Field Name | | Written Content |
|---|---|---|
| Disc General Info. | | Disc Volume Info., Total Title Quantity, etc. |
| Title Info. table | Title Pointer | Storage Address of Title#1 Info., Other Info. about Title#1, such as Title Type |
| | Title#1 Info. | Head P List No. of Title#1, Other Info. about this P List |
| Other Info. | | |

P List Info. File: 122

| Field Name | | | Written Content |
|---|---|---|---|
| P List General Info. | | | P List Size, Total P List Quantity., etc. |
| P List Pointer table | P List #1 Pointer | | P List #1 Info. Storage Address |
| P List #1 Info. table | P List #1 General Info. | | Total Quantity. of Items constituting P List #1= 1, Other Info. |
| | P List #1 Item Info. table | Item#1 Info. | Relevant AU No. in AU Table in Object Info. File, etc. |
| | Other Info. | | Command Content, etc. |

AU Table　131

| Field Name | | | | Content |
|---|---|---|---|---|
| AU table General Info. | | | | Quantity of AUs, Pointer to Each AU, etc. |
| AU Table | AU #1　302 | Divisional Unit Info. | | Divisional Unit Address table Position, etc. |
| | | PU #1 | ES_Table Index #1 | ES_map table Index No. = 1 |
| | | | ES_Table Index #2 | 2 |
| | | | ES_Table Index #3 | 3 |
| | | PU #2 | ES_Table Index #1 | 4 |
| | | | ES_Table Index #2 | 5 |
| | | | ES_Table Index #3 | 6 |
| | | PU #3 | ES_Table Index #1 | 7 |
| | | | ES_Table Index #2 | 8 |
| Other Info. | | | | ES_Map table Position, etc. |

Divisional Unit Address table / 133

| Field Name | Content |
|---|---|
| General Info. | Divisional Unit Type, Total Quantity. of Divisional Units, etc. |
| Divisional Unit #1 | Head Address |
| | Divisional Unit Length |
| | Other Info. |
| Divisional Unit #2 | Head Address |
| | Divisional Unit Length |
| | Other Info. |
| . . . | . . . |
| Divisional Unit #n | Head Address |
| | Divisional Unit Length |
| | Other Info. |
| Other Info. | Other Info. |

FIG. 17

ES_Map Table / 134

| Field Name | | Content | |
|---|---|---|---|
| ES_Map Table | ES_map table General Info. | Quantity of Indexes, etc. | |
| | Index #1 | ES_PID value = 101 | 134a |
| | | Using Divisional Unit No. Info. | |
| | | Address Info. | |
| | Index #2 | ES_PID = 103 | |
| | | Using Divisional Unit No. Info. | |
| | | Address Info. | |
| | Index #3 | ES_PID = 104 | 134b |
| | | Using Divisional Unit No. Info. | |
| | | Address Info. | |
| | Index #4 | ES_PID = 102 | |
| | | Using Divisional Unit No. Info. | |
| | | Address Info. | |
| | Index #5 | ES_PID = 103 | |
| | | Using Divisional Unit No. Info. | |
| | | Address Info. | |
| | Index #6 | ES_PID = 104 | |
| | | Using Divisional Unit No. Info. | |
| | | Address Info. | |
| | Index #7 | ES_PID = 201 | |
| | | Using Divisional Unit No. Info. | |
| | | Address Info. | |
| | Index #8 | ES_PID = 202 | |
| | | Using Divisional Unit No. Info. | |
| | | Address Info. | |
| | Other Info. | Other Info. | |

US 8,081,871 B2

INFORMATION RECORDING MEDIUM, INFORMATION RECORDING APPARATUS AND METHOD, INFORMATION REPRODUCING APPARATUS AND METHOD, AND COMPUTER PROGRAM FOR RECORD OR REPRODUCTION CONTROL

TECHNICAL FIELD

The present invention relates to: an information recording medium, such as a high density optical disc, onto which various information can be recorded at high density, such as main picture information or video information, audio information, sub-picture information, reproduction control information, and so on; an apparatus for and a method of recording the information onto the information recording medium; an apparatus for and a method of reproducing the information from the information recording medium; an apparatus and a method capable of both recording and reproducing the information and capable of editing contents, such as an audio; a computer program for controlling the recording or reproduction; and a data structure including a control signal for reproduction control.

BACKGROUND ART

DVDs become common as optical discs onto which various information is recorded, such as content information, which is video information, audio information, sub-picture information, or the like, and reproduction control information and so on. According to a DVD standard, the video information (video data), the audio information (audio data) and the sub-picture information (sub-picture data) are packetized each with the reproduction control information (navigation data), and are multiplexed and recorded onto a disc in a program stream format of MPEG 2 (Moving Picture Experts Group phase 2), which is a high performance encoding technology. Among them, the video information has data, which is compressed in a MPEG video format (ISO 13818-2), by one stream in one program stream. On the other hand, the audio information is recorded in a plurality of formats (i.e. linear PCM, AC-3, MPEG audio and so on) and has data for up to 8 streams in one program stream. The sub-picture information is defined by a bitmap, and is compressed and recorded in a run length method, and has data for up to 32 streams in one program stream.

In the case of the DVD, as described above, a plurality of streams of the selectable audio information (e.g. streams of a stereo sound, a surrounding sound, an original English sound, a dubbed Japanese sound, and the like) and a plurality of streams of the selectable sub picture information (e.g. streams of Japanese subtitle, English subtitle, and the like) are multiplexed and recorded, by using the program stream format, with respect to one stream of the video information in one movie or film, for example.

On the other hand, a transport stream format of MPEG2 standard has been recently standardized, which is suitable for larger-capacity and higher-speed data transfer. According to the transport stream format, a plurality of elementary streams are transferred at the same time at a much higher transfer speed than that of the above-mentioned program stream format. For example, a plurality of programs, such as a plurality of satellite digital broadcasting TV channels in one satellite radio wave, are transmitted at the same time in a TDM (Time Division Multiplex) scheme. Namely, in the transport stream format, a plurality of elementary streams of the video, each having a large data amount, can be time-division-multiplexed and transmitted at the same time. For example, a plurality of movies recorded on a plurality of DVDs can be transmitted at the same time.

Incidentally, in the present application, a signal video stream existing in a stream group which can be multiplexed and recorded and which can be synchronously reproduced, such as the above-mentioned program stream for example, or a situation that there is a single video stream in the stream group, is referred to as a "single video stream" as occasion demands.

DISCLOSURE OF INVENTION

However, the conventional DVD on which the recording is performed in the program stream format, as mentioned above, has a difficulty or impossibility in recording a plurality of main pictures or video, related to a plurality of shows (or programs) broadcasted at the same time, such as digital broadcasting, so as to make them changeable upon reproduction thereof, because it can only multiplex and record the video made of one stream (e.g. a motion picture) with the audio information or the sub-picture information made of a plurality of streams (e.g. a subtitle and still image). Moreover, it is difficult to record a plurality of video related to one show (or program), such as a plurality of angle video images or a plurality of multi-view video images which can be mutually changed, so as to make them changeable upon reproduction thereof. In particular, it is extremely difficult to make them changeable, with the reproduction time axis thereof unified, to some degree or completely.

Here, it is assumed that a recording density or transfer rate which is good enough to multiplex and record the video made of a plurality of streams can be obtained in the DVD on which the recording is performed in the program stream format due to the shorter wavelength of a laser beam for recording or reproduction, and due to minute tracks or pits. Even so, it is technically difficult to quickly extract only a series of packets which constitutes a stream related to a desired show or program and which is normally arranged discretely, from among many multiplexed packets related to the video made of the plurality of streams, to thereby perform the reproduction without delay on the basis of the extracted packets. It is also technically difficult to perform the recording to allow the reproduction such that. In particular, it is technically extremely difficult to specify one stream group related to a show or program expected to be reproduced (e.g. a group of one stream of video and one or a plurality of corresponding audio or sub-picture), out of a plurality of shows or programs once recorded on the optical disc, to thereby perform reproduction on the basis of the specified one stream group. It is technically extremely difficult to quickly change one stream group to another stream group related to another show or program expected to be reproduced during the reproduction of one stream group, to thereby perform reproduction on the basis of the changed another stream group.

The present invention has been accomplished in view of the above problems for example. It is therefore an object of the present invention to provide an information recording medium on which it looks from a user's side as if it is possible to perform multiplex-recording and synchronous reproduction of a plurality of video streams and it is possible to perform a seamless or non-seamless mutual change among the plurality of video streams upon reproduction, even if having such a restriction that only the presence of a single video stream is allowed in the stream which can be multiplexed and recorded and which can be synchronously reproduced, such as the above-mentioned program stream, for example, as well as an information recording apparatus and method, an information reproducing apparatus and method, an information recording/reproducing apparatus and method, a computer program for record or reproduction control, and a data structure including a control signal for reproduction control, which enable the recording and the reproduction performed on the information recording medium.

Hereinafter, the information recording medium, the information recording apparatus and method, the information reproducing apparatus and method, the information recording/reproducing apparatus and method and the computer program of the present invention will be described in turn.

(Information Recording Medium)

The above object of the present invention can be achieved by an information recording medium on which a plurality of stream groups (e.g. a conventional program stream (PS) including up to one video stream, up to 8 audio streams and up to 32 sub-picture streams, i.e. a Vision #1 stream group, a Vision #2 stream group and so on) are multiplexed and recorded by a unit of packet (e.g. a unit of TS packet), which is a physically accessible unit, each of the stream groups including a plurality of portion streams (e.g. elementary streams), each of the portion streams being constructed from a series of content information, each of the stream groups including one video stream, which is one of the portion streams, constructed from video information as being one of the content information, the information recording medium provided with: an object data file for storing object data which is a logically accessible unit and provided with a plurality of packets, each storing therein a piece of the content information; and an object information file for storing correspondence definition information (e.g. an elementary stream (ES) map table) for defining a correspondence relationship between the plurality of portion streams and the plurality of packets which are multiplexed on a time axis, as reproduction control information for controlling reproduction of the object data, the object data being divided by a divisional unit, which comprises the plurality of packets and corresponds to one of the plurality of stream groups, in at least one portion of a reproduction section, the object information file further storing therein unit address information (e.g. a divisional unit address table) indicating an address of each of divisional units, as the reproduction control information.

According to the information recording medium of the present invention, each of the portion streams is constructed from a series of content information which can be reproduced by an information reproducing apparatus. For example, each of the portion streams is constructed from video information (video data), audio information (audio data) and sub-picture information (sub-picture data). In other words, one "portion stream" in this application indicates one data array or information array, such as a video stream, an audio stream, and a sub-picture stream, which are the elementary streams and which constitute a series of contents. Each of the plurality of stream groups includes one portion stream constructed from the video information (i.e. the video stream). In other words, each of the plurality of stream groups has a "single video stream" structure. In addition, each of the plurality of stream groups may include at least one portion stream constructed from the audio information (i.e. the audio stream). Each of the plurality of stream groups may include at least one portion stream constructed from the sub-picture information (i.e. the sub-picture stream).

Each stream group is multiplexed and recorded by the unit of packet (e.g. a unit of TS packet discussed later), which is a physically accessible unit by an information recording apparatus or an information recording/reproducing apparatus. In particular, the object data file stores the object data which is a logically accessible unit by an information reproducing apparatus and is provided with a plurality of packets, each storing therein a piece of the content information. The object information file stores the correspondence definition information (e.g. an ES map table including an elementary stream packet ID (ES_PID) and the like, described later), as the reproduction control information for controlling the reproduction of the object data file by the information reproducing apparatus.

In particular, the object data is divided and stored by the divisional unit, which is provided with the plurality of packets and corresponds to one of the plurality of stream groups, in at least one portion of a reproduction section (e.g. a block including at least one divisional unit). In other words, a plurality of divisional units are alternately or discretely located. Each divisional unit stores therein a series of content information included in one stream group including one video stream, and the reproduction by the divisional unit can be performed by the information reproducing apparatus or the information recording/reproducing apparatus.

Moreover, the object information file further stores therein the unit address information (e.g. a divisional unit address table) indicating an address of each of divisional units, as the reproduction control information.

Therefore, in normal reproduction and special reproduction (e.g. in fast-forwarding, rewinding, etc.), it is possible to obtain the address of the divisional unit (e.g. the head address of each divisional unit), quickly and easily, on the basis of the unit address information. After that, the plurality of packets arranged in order may be reproduced in the divisional unit. These make it possible to complete access to the divisional unit in a short time and to quickly reproduce the packets included therein. By continuously performing these operations, a series of content information can be continuously reproduced.

It is possible to select and reproduce the divisional unit related to the desired stream group by referring the unit address information. In other words, each stream group includes one video stream, it is possible to reproduce the desired video (e.g. together with the audio information and the sub-picture information corresponding thereto). Thus, it is possible to change and reproduce the video, as occasion demands, by changing the divisional unit to be reproduced, by a user's operation, for example.

By this, it looks from a user's side as if it is possible to perform the multiplex recording and synchronous reproduction of a plurality of video streams, even on the information recording medium having a restriction of the single video stream, such as a conventional DVD compliant with the program stream format. Moreover, it is possible to perform the seamless or non-seamless mutual change between or among the plurality of video streams in the reproduction.

For example, when a transport stream, having two video streams and two audio streams, each of the audio streams corresponding to respective one of the video streams, and multiplexed and recorded in a synchronous reproducible way or change reproducible way on another information recording medium which does not have the single video stream structure, as opposed to the information recording medium of the present invention, is recorded onto the information recording medium of the present invention, the transport stream is divided by the divisional unit, for each stream group provided with one video stream and two audio streams corresponding thereto. By this, although each stream group is compliant with the program stream format, it looks from a user's side as if it is possible to perform the multiplex recording and synchronous reproduction of the plurality of video streams.

Namely, by selecting and reproducing the divisional unit related to the stream group including one video stream, it is possible to reproduce a series of content information related to one video information. On the other hand, by selecting and reproducing the divisional unit related to the stream group including another video stream, it is possible to reproduce a series of content information related to another video information. Then, by changing the divisional units to be selected, it is possible to change, as occasion demands, a series of content information related to one video information and a series of content information related to another video information.

Consequently, according to the information recording medium of the present invention, the correspondence definition information and the unit address information stored in the object information file are referred to, to thereby select the divisional unit related to the desired stream group from among the plurality of divisional units, and to reproduce a series of content information, as occasion demands. In this case, by selecting the divisional unit related to a stream group different from the currently reproduced stream group, it is possible to perform the operation of changing to a series of content information related to the desired stream group. Therefore, regardless of the restriction of the single video stream on the information recording medium, such as a conventional DVD, the plurality of stream groups can be changed and reproduced by selecting the divisional unit to be selected, as occasion demands. In other words, it looks from a user's side as if it is possible to change and reproduce the plurality of video streams, as occasion demands.

As described above, according to the present invention, there is a great advantage that it is possible to record a plurality of video information, transmitted in the transport stream having a structure with a plurality of video streams into a DVD having the single stream structure, which is now widely spread. There is a great advantage that it is possible to properly reproduce the plurality of video information, transmitted in the transport stream having the structure with the plurality of video streams recorded on the DVD having the single stream structure, which is now widely spread.

Incidentally, various information which is stored into the object information file of the present invention is not multiplexed by the unit of packet on the information recording medium, as opposed to the case of the object data file. Therefore, on an information reproducing apparatus, it is possible to efficiently reproduce the multiplexed and recorded object data, on the basis of the collectively read reproduction control information. Moreover, the address of the packet according to the present invention may be a physical address; however, more generally, it may be a logical address. The actual physical address has such a feature that it is uniquely specified from the logical address under the management of the file system.

In one aspect of the information recording medium of the invention, each of the plurality of stream groups includes at least one of a sub-picture stream which is another one of the portion streams, constructed from sub-picture information as being another one of the content information and an audio stream, which is another one of the portion streams, constructed from audio information as being another one of the content information, and the plurality of stream groups are stream groups for mutually performing an angle change.

According to this aspect, the stream group, including one video stream and at least one of the sub-picture stream and the audio stream, is divided by a predetermined unit (by the divisional unit), to thereby construct the object data. Thus, the reproduction by the divisional unit makes it possible to reproduce a series of content information, constructed from the video data, the audio data, and the sub-picture data, relatively easily.

Then, each of the plurality of stream groups includes the content information corresponding to angle reproduction. Therefore, it is possible to perform the angle change, relatively easily, by changing over the divisional unit related to one angle (i.e. the stream group related to one angle) to the divisional unit related to another angle (i.e. the stream group related to another angle) during the reproduction of the former one and reproducing the latter one. Thus, the reproduction by the divisional unit makes it possible to change and reproduce a series of content information related to a plurality of angles, seamlessly, as occasion demands.

As described above, in an aspect of the information recording medium in which the plurality of stream groups are stream groups for mutually performing the angle change, the object data may be divided by the divisional unit which is provided with the plurality of packets having an equal reproduction start time point and an equal reproduction end time point on a reproduction time axis, in the streams groups for performing the angle change.

By such construction, the object data is divided by the divisional unit having an equal reproduction start time point and an equal reproduction end time point on a reproduction time axis, in the stream groups for mutually changing the angle. Therefore, in the angle change performed by an information reproducing apparatus, it is possible to perform a relatively easy angle change by accessing to the unit address information.

In another aspect of the information recording medium of the present invention, each of the plurality of stream groups includes at least one of a sub-picture stream, which is another one of the portion streams, constructed from sub-picture information as being another one of the content information and an audio stream, which is another one of the portion streams, constructed from audio information as being another one of the content information, and the plurality of stream groups are stream groups for mutually performing a non-angle change.

According to this aspect, the stream group, including one video stream and at least one of the sub-picture stream and the audio stream, is divided by a predetermined unit (by the divisional unit), to thereby construct the object data. Thus, the reproduction by the divisional unit makes it possible to reproduce a series of content information, constructed from the video data, the audio data, and the sub-picture data, relatively easily.

Then, each of the plurality of stream groups can be divided into the divisional units even if the stream groups are independent content information (i.e. two different movies or the like). Therefore, it is possible to change and reproduce the different series of content information (or different video), as occasion demands, by selecting the divisional units related to the plurality of stream groups. In other words, it is possible to change and reproduce a plurality of video, non-seamlessly. If such reproduction is performed, it is also possible to reproduce a plurality of shows, broadcasted in the same time zone by the digital broadcasting, while recreating the same environment as that in the broadcasting. For example, from a user's standpoint, it is possible to watch a plurality of channels while changing a channel 1 and a channel 3 during the reproduction, as in receiving the broadcast.

Alternatively, even without changing the divisional units, it is possible to properly reproduce the desired content information by selecting and reproducing the divisional unit related to the desired content information.

In another aspect of the information recording medium of the present invention, the unit address information (e.g. a divisional unit address table) includes a head address of each of the divisional units.

According to this aspect, upon reproduction, the head address of each divisional unit can be obtained, quickly and easily, on the basis of the unit address information. After that, the plurality of packets arranged in order may be reproduced in the divisional unit after the access.

Incidentally, the "head address" in the present invention may be serial numbers or continuous numbers (e.g. an offset address or a relative address) given in a divided reproduction section (e.g. a divisional block obtained by grouping a plurality of divisional units related to predetermined stream groups. Alternatively, for example, it may be serial numbers or continuous numbers (e.g. an absolute address) given in a larger data unit, such as one object data file and all the object data files.

In another aspect of the information recording medium of the present invention, the unit address information includes unit size information indicating a size of each of the divisional units.

According to this aspect, even if the length of the divisional unit is a variable length, for example, the reproduction can be performed by the divisional unit, relatively easily. Namely, upon reproduction, it is possible to specify the data length of the divisional unit which is variable, for example, quickly and easily, by referring to the unit size information stored in the object information file. Incidentally, the size of the divisional unit can be specified by a calculation of the interval of the head position of each divisional unit or the like, on the basis of the above-mentioned head address or the like.

In another aspect of the information recording medium of the present invention, the unit address information is stored in the object information file, as a divisional unit address table obtained by making a table of the plurality of divisional units, and the correspondence definition information is stored in the object information file, as a correspondence definition information table (e.g. an ES map table) obtained by making a table of the plurality of portion streams.

According to this aspect, upon reproduction, it is possible to reproduce the divisional unit constituting a series of content information, in proper order, from among the plurality of divisional units, more efficiently, by referring to the correspondence definition information table and the divisional unit address table stored in the object information file.

In another aspect of the information recording medium of the present invention, the correspondence definition information includes divisional unit number information indicating an identification number of each of the corresponding divisional units for each of the stream groups.

According to this aspect, upon reproduction, it is possible to specify the divisional unit to be reproduced, quickly and relatively easily, even in the case of the divisional units discretely located (i.e. the divisional units which are not stored in the reproduction order, for example), by referring to the divisional unit number information. Therefore, it is possible to select and continuously reproduce the divisional unit constituting a series of content information (i.e. the divisional unit constituting a predetermined stream group), relatively easily.

More specifically, the correspondence definition information may include the identification number of the corresponding divisional unit for each of the portion streams included in one stream group. Thus, it is possible to specify the divisional unit constituting each of the video stream, the audio stream, or the sub-picture stream, included in one stream group, for example, relatively easily.

In another aspect of the information recording medium of the present invention, the divisional unit number information is stored in reproduction order of the divisional units.

According to this aspect, it is possible to reproduce the divisional units in the proper order, simply by continuously accessing the divisional unit number information stored in the reproduction order.

In other words, it is possible to continuously reproduce the divisional units, relatively easily, without a need of a predetermined table or the like which indicates the reproduction order (or reproduction sequence) of the divisional units.

In another aspect of the information recording medium of the present invention, the unit address information includes information for indicating a unit type of the divisional unit.

According to this aspect, upon reproduction by an information reproducing apparatus, for example, it is possible to judge, relatively easily, whether the divisional unit constitutes the stream group for performing an angle change or the stream group for performing a non-angle change, or the stream group for performing a seamless change or the stream group for performing a non-seamless change, by referring to the information for indicating the unit type in the unit address information.

In another aspect of the information recording medium of the present invention, the correspondence definition information (e.g. an ES map table) includes: portion stream packet identification information (e.g. an ES_PID) for identifying each of the plurality of packets for each of the portion streams; and portion stream address information (e.g. ES address information) for indicating an address of each packet for each of the portion streams, with respect to at least one portion of the packets.

According to this aspect, upon reproduction, it is possible to mutually identify the plurality of packets multiplexed and recorded on the time axis, by using the portion stream packet identification information included in the correspondence definition information. For example, with reference to the portion stream packet identification information, it is possible to specify to which portion stream the plurality of packets correspond, which are multiplexed on the time axis, such as a recording time axis and a reproduction time axis, and which exist by the number of the portion streams with respect to a time point. Moreover, the address of each packet specified in this manner can be obtained by referring to the portion stream address information included in the correspondence definition information.

In an aspect related to the above-mentioned portion stream address information, the portion stream address information (e.g. ES address information) may include packet address information for indicating an address of each packet in a format corresponding to each reproduction start time point, for each of the portion streams, with respect to at least one portion of the packets.

By such construction, it is possible to obtain the address of each packet corresponding to the portion stream (or the stream group) to be reproduced, by referring to the packet address information, constructed from serial numbers or continuous numbers (e.g. an offset address or a relative address) given in a divisional block, for example.

Incidentally, in another aspect of the information recording medium of the present invention, it is further provided with a reproduction sequence information file (e.g. a play list information file) for storing reproduction sequence information (e.g. play list information described later) which defines a reproduction sequence of the object data stored in the object data file.

According to this aspect, as opposed to the case of the object data file, since the reproduction sequence information is not multiplexed by the unit of packet on the information recording medium, it is possible to expectedly reproduce the object data on an information reproducing apparatus, on the basis of the above-mentioned reproduction control information and the reproduction sequence information.

(Information Recording Apparatus and Method)

The above object of the present invention can be also achieved by an information recording apparatus for multiplexing and recording a plurality of stream groups onto an information recording medium by a unit of packet, which is a physically accessible unit, each of the stream groups including a plurality of portion streams, each of the portion streams being constructed from a series of content information, and each of the stream groups including one video stream, which is one of the portion streams, constructed from video information as being one of the content information, the information recording apparatus provided with: a first recording device for recording an object data file for storing object data which is a logically accessible unit and comprises a plurality of packets, each storing therein a piece of the content information; and a second recording device for recording an object information file for storing correspondence definition information for defining a correspondence relationship between the plurality of portion streams and the plurality of packets which are multiplexed on a time axis, as reproduction control information for controlling reproduction of the object data, the object data being divided by a divisional unit, which comprises the plurality of packets and corresponds to one of the plurality of stream groups, in at least one portion of a reproduction section, the object information file further storing therein unit address information indicating an address of each of divisional units, as the reproduction control information.

According to the information recording apparatus of the present invention, the first recording device, such as a system controller, an encoder, and an optical pickup, records the object data file for storing the object data. The second recording device, such as a system controller, an encoder, a TS object generator described later, and an optical pickup, records the object information file for storing the correspondence definition information. Moreover, the object data is divided by the divisional unit, and the object information file further stores therein the unit address information indicating the address of each divisional unit, as the reproduction control information. Therefore, it is possible to reproducibly multiplex and record the stream group, such as the at least one portion of a MPEG 2 transport stream, for example, onto the above-mentioned information recording medium of the present invention, with the stream group being divided by the divisional unit.

For example, when a transport stream, having two video streams and two audio streams, each of the audio streams corresponding to respective one of the video streams, recorded on an information recording medium in a MPEG 2 or MPEG 4 transport stream format having a structure with a plurality of video, as opposed to the information recording medium of the present invention, is recorded onto the information recording medium of the present invention, the transport stream is divided by the divisional unit, for each stream group provided with one video stream and two audio streams corresponding thereto. By this, although each stream group is compliant with the program stream format, it looks from a user's side as if it is possible to perform the multiplex recording and synchronous reproduction of the plurality of video streams, as in the reproduction on the information recording medium in the transport stream format.

Incidentally, the information recording apparatus of the present invention can also adopt various aspects in response to various aspects of the above-described information recording medium of the present invention.

In one aspect of the information recording apparatus of the present invention, the first recording device is provided with a buffer device having a plurality of buffer areas, each of which temporarily stores therein the plurality of stream groups for each of the divisional unit, and the first recording device prepares the object data for each of the divisional unit after storing the stream groups into the buffer areas.

According to this aspect, the first recording device, provided with the buffer device including a recording medium, such as a RAM, can prepare the object data divided by the divisional unit, after temporarily storing the plurality of stream groups in the predetermined buffer areas for each divisional unit.

Therefore, for example, it is possible to separate a process of dividing the transport stream for each stream group and a process of preparing the object data from the divided stream groups and recording it onto the information recording medium. Thus, it is possible to efficiently record it in order, for each divisional unit.

In an aspect of the information recording apparatus provided with the buffer device, as described above, each of the portion streams may include stream packet identification information for identifying at least one portion of each of the portion streams, for each unit of packet, and the first recording device may store at least one portion of each of the portion streams into the buffer areas by the unit of packet, on the basis of the stream packet identification information.

By such construction, it is possible to specify to which stream group each packet corresponds, relatively easily, by referring to the stream packet identification information owned by each packet (e.g. TS packet) constituting the portion stream, which is inputted onto the information recording apparatus of the present invention, by using a MPEG analyzer described later, for example. Therefore, it is possible to store each packet into the corresponding buffer area for each stream group, relatively easily.

In another aspect of the information recording apparatus of the present invention, the plurality of stream groups are stream groups for mutually performing an angle change, and the first recording device prepares the object data which is divided by the divisional unit which comprises the plurality of packets having an equal reproduction start time point and an equal reproduction end time point on a reproduction time axis, in the streams groups for performing the angle change.

According to this aspect, it is possible to record the plurality of stream groups by each of the divisional units which have the equal reproduction start time point and the equal reproduction end time point and which can be mutually changed.

Thus, according to an information reproducing apparatus or an information recording/reproducing apparatus described later, it is possible to perform a seamless angle change (i.e. angle reproduction), relatively easily, by changing the divisional unit to be reproduced.

Incidentally, in this aspect, every time the plurality of packets having a predetermined time length are recorded into the buffer areas, the recording onto the information recording medium is preferably performed while being the packets as the divisional unit. However, the present invention is not limited to this aspect, if the recording is performed by each of the divisional units having the equal reproduction start time point and the equal reproduction end time point, it is possible to achieve the same effect as in the information recording medium of the present invention.

In another aspect of the information recording apparatus of the present invention, the plurality of stream groups are stream groups for mutually performing a non-angle change, and the first recording device prepares the object data which is divided by the divisional unit which comprises the plurality of packets having a predetermined data amount, in the streams groups for performing the non-angle change.

Incidentally, in this aspect, every time the plurality of packets having a predetermined data amount are recorded into the buffer areas, the recording onto the information recording medium is preferably performed while being the packets as the divisional unit. However, the present invention is not limited to this aspect, if the recording is performed by each of the divisional units having the predetermined data amount, it is possible to achieve the same effect as in the information recording medium of the present invention.

The above object of the present invention can be also achieved by an information recording method of multiplexing and recording a plurality of stream groups onto an information recording medium by a unit of packet, which is a physically accessible unit, each of the stream groups including a plurality of portion streams, each of the portion streams being constructed from a series of content information, and each of the stream groups including one video stream, which is one of the portion streams, constructed from video information as being one of the content information, the information recording method provided with: a first recording process of recording an object data file for storing object data which is a logically accessible unit and comprises a plurality of packets, each storing therein a piece of the content information; and a second recording process of recording an object information file for storing correspondence definition information for defining a correspondence relationship between the plurality of portion streams and the plurality of packets which are multiplexed on a time axis, as reproduction control information for controlling reproduction of the object data, the object data being divided by a divisional unit, which comprises the plurality of packets and corresponds to one of the plurality of stream groups, in at least one portion of a reproduction section, the object information file further storing therein unit address information indicating an address of each of divisional units, as the reproduction control information.

According to the information recording method of the present invention, the object data file for storing the object data is recorded by the first recording process. The object information file for storing the correspondence definition information is recorded by the second recording process. Moreover, the object data is divided by the divisional unit, and the object information file further stores therein the unit address information indicating the address of each divisional unit, as the reproduction control information. Therefore, it is possible to reproducibly multiplex and record the stream group, such as the at least one portion of a MPEG 2 transport stream, for example, onto the above-mentioned information recording medium of the present invention, with the stream group divided by the divisional unit.

Incidentally, the information recording method of the present invention can also adopt various aspects in response to various aspects of the above-described information recording medium of the present invention.

(Information Reproducing Apparatus and Method)

The above object of the present invention can be also achieved by an information reproducing apparatus for reproducing the recorded content information from the above-mentioned information recording medium of the present invention (including its various aspects), the information reproducing apparatus provided with: a reading device for physically reading information from the information recording medium; and a reproducing device for reproducing the object data for each of the portion streams while combining divisional units related to a same stream group, out of the plurality of divisional units, on the basis of the correspondence definition information and the unit address information included in the information read by the reading device.

According to the information reproducing apparatus of the invention, the reading device, such as an optical pickup and a demodulator, physically reads the information by the unit of packet or the like, from the information recording medium. Then, the reproducing device, such as a system controller, a demultiplexer, and a decoder, reproduces the object data for each of the portion streams (or for each stream group) while combining divisional units related to the same stream group, out of the plurality of divisional units, on the basis of the correspondence definition information and the unit address information included in the read information. Therefore, it is possible to perform the reproduction on the above-mentioned information recording medium of the present invention (including its various aspects). For example, regardless of the restriction of the single video stream on the information recording medium, such as a conventional DVD, the plurality of stream groups can be changed and reproduced by selecting the divisional unit to be selected, as occasion demands. In other words, it looks from a user's side as if it is possible to change and reproduce the plurality of video streams, as occasion demands.

Incidentally, the information reproducing apparatus of the present invention can also adopt various aspects in response to various aspects of the above-described information recording medium of the present invention.

The above object of the present invention can be also achieved by an information reproducing method of reproducing the recorded content information from the above-mentioned information recording medium of the present invention (including its various aspects), the information reproducing method provided with: a reading process of physically reading information from the information recording medium; and a reproducing process of reproducing the object data for each of the portion streams while combining divisional units related to a same stream group, out of the plurality of divisional units, on the basis of the correspondence definition information and the unit address information included in the information read by the reading process.

According to the information reproducing method of the present invention, the information is physically read by the unit of packet from the information recording medium. Then, the object data is reproduced for each of the portion streams (or for each stream group) while combining divisional units related to the same stream group, out of the plurality of divisional units, on the basis of the correspondence definition information and the unit address information included in the read information. Therefore, it is possible to perform the reproduction on the above-mentioned information recording medium of the present invention (including its various aspects).

Incidentally, the information reproducing method of the present invention can also adopt various aspects in response to various aspects of the above-described information recording medium of the present invention.

(Information Recording/Reproducing Apparatus and Method)

The above object of the present invention can be also achieved by an information recording/reproducing apparatus for recording the content information onto the above-mentioned information recording medium of the present invention (including its various aspects) and for reproducing the recorded content information, the information recording/reproducing apparatus provided with: a first recording device for recording the object data file; a second recording device for recording the object information file; a reading device for physically reading information from the information recording medium; and a reproducing device for reproducing the object data for each of the portion streams while combining divisional units related to a same stream group, out of the plurality of divisional units, on the basis of the correspondence definition information and the unit address information included in the information read by the reading device.

According to the information recording/reproducing apparatus of the present invention, as in the case of the above-mentioned information recording apparatus of the present invention, the first recording device records the object data file, and the second recording device records the object information file. After that, as in the case of the above-mentioned information reproducing apparatus of the present invention, the reading device physically reads the information from the information recording medium. Then, the reproducing device reproduces the object data for each of the portion streams (or for each stream group) while combining divisional units related to the same stream group, out of the plurality of divisional units, on the basis of the correspondence definition information and the unit address information included in the read information. Therefore, it is possible to reproducibly multiplex and record the content information, with it divided by the divisional unit, onto the above-mentioned information recording medium of the present invention and further reproduce it, properly.

Incidentally, the information recording/reproducing apparatus of the present invention can also adopt various aspects in response to various aspects of the above-described information recording medium of the present invention.

The above object of the present invention can be also achieved by an information recording/reproducing method of recording the content information onto the above-mentioned information recording medium of the present invention (including its various aspects) and for reproducing the recorded content information, the information recording/reproducing method provided with: a first recording process of recording the object data file; a second recording process of recording the object information file; a reading process of physically reading information from the information recording medium; and a reproducing process of reproducing the object data for each of the portion streams while combining divisional units related to a same stream group, out of the plurality of divisional units, on the basis of the correspondence definition information and the unit address information included in the information read by the reading process.

According to the information recording/reproducing method of the present invention, as in the case of the above-mentioned information recording method of the present invention, the object data file is recorded by the first recording process, and the object information file is recorded by the second recording process. After that, as in the case of the above-mentioned information reproducing method of the present invention, the information is physically read from the information recording medium. Then, the object data is reproduced for each of the portion streams (or for each stream group) while combining divisional units related to the same stream group, out of the plurality of divisional units, on the basis of the correspondence definition information and the unit address information included in the read information. Therefore, it is possible to reproducibly multiplex and record the content information, with it divided by the divisional unit, onto the above-mentioned information recording medium of the present invention and further reproduce it, properly.

Incidentally, the information recording/reproducing method of the present invention can also adopt various aspects in response to various aspects of the above-described information recording medium of the present invention.

(Computer Program)

The above object of the present invention can be also achieved by a first computer program for a record control to control a computer disposed at the above-mentioned information recording apparatus of the present invention (including its various aspects), the program making the computer function as at least a part of the first recording device and the second recording device.

According to the computer program for a record control of the invention, the information recording apparatus according to the present invention mentioned above may be realized relatively easily, by reading and running the computer program from a recording medium, such as a ROM, a CD-ROM, a DVD-ROM, a hard disk and so on, storing the computer program therein/thereon, or by downloading the computer program to the computer via the communication device and running it.

The above object of the present invention can be also achieved by a second computer program for a reproduction control to control a computer disposed at the above-mentioned information reproducing apparatus of the present invention (including its various aspects), the program making the computer function as at least a part of the reading device and the reproducing device.

According to the computer program for a reproduction control of the invention, the information reproducing apparatus according to the present invention mentioned above may be realized relatively easily, by reading and running the computer program from a record medium, such as a ROM, a CD-ROM, a DVD-ROM, a hard disk and so on, storing the computer program therein/thereon, or by downloading the computer program to the computer via the communication device and running it.

The above object of the present invention can be also achieved by a third computer program for a record reproduction control to control a computer disposed at the above-mentioned information recording/reproducing apparatus of the present invention (including its various aspects), the program making the computer function as at least a part of the first recording device, the second recording device, the reading device and the reproducing device.

According to the computer program for a record reproduction control of the invention, the information recording/reproducing apparatus according to the present invention mentioned above may be embodied relatively easily, by reading and running the computer program from a record medium, such as a ROM, a CD-ROM, a DVD-ROM, a hard disk and so on, storing the computer program therein/thereon, or by downloading the computer program to the computer via the communication device and running it.

Incidentally, the computer program for a record reproduction control according to the present invention may also take various aspects, corresponding to various aspects of the information recording medium according to the present invention as mentioned above.

The above object of the present invention can be also achieved by a computer program product for a record control in a computer-readable medium for tangibly embodying a program of instructions executable by a computer disposed at the above-mentioned information recording apparatus according to the present invention (including various aspects), the program making the computer function as at least a part of the first recording device and the second recording device.

The above object of the present invention can be also achieved by a computer program product for a reproduction control in a computer-readable medium for tangibly embodying a program of instructions executable by a computer disposed at the above-mentioned information reproducing apparatus according to the present invention (including various aspects), the program making the computer function as at least a part of the reading device and the reproducing device.

The above object of the present invention can be also achieved by a computer program product for a record reproduction control in a computer-readable medium for tangibly embodying a program of instructions executable by a computer disposed at the above-mentioned information recording/reproducing apparatus according to the present invention (including various aspects), the program making the computer function as at least a part of the first recording device, the second recording device, the reading device and the reproducing device.

According to the computer program product for the record control, the reproduction control, or the record reproduction control of the invention, at least a part of the first recording device, the second recording device, the reading device and the reproducing device according to the present invention mentioned above may be embodied relatively easily, by reading and running the computer program product from a record medium, such as a ROM, a CD-ROM, a DVD-ROM, a hard disk and so on, storing the computer program therein/thereon, or by downloading the computer program product to the computer via the communication device and running it. More specifically, the computer program product may be made of computer readable codes (or computer readable commands) to make the computer function as at least a part of the first recording device, the second recording device, the reading device and the reproducing device.

(Data Structure Including Control Signal)

The above object of the present invention can be also achieved by A data structure including a control signal in which a plurality of stream groups are multiplexed and recorded by a unit of packet, which is a physically accessible unit, each of the stream groups including a plurality of portion streams, each of the portion streams being constructed from a series of content information, each of the stream groups including one video stream, which is one of the portion streams, constructed from video information as being one of the content information, the data structure provided with: an object data file for storing object data which is a logically accessible unit and comprises a plurality of packets, each storing therein a piece of the content information; and an object information file for storing correspondence definition information for defining a correspondence relationship between the plurality of portion streams and the plurality of packets which are multiplexed on a time axis, as reproduction control information for controlling reproduction of the object data, the object data being divided by a divisional unit, which comprises the plurality of packets and corresponds to one of the plurality of stream groups, in at least one portion of a reproduction section, the object information file further storing therein unit address information indicating an address of each of divisional units, as the reproduction control information.

According to the data structure including the control signal of the invention, similarly to the case of the information recording medium according to the present invention as mentioned above, it is possible to efficiently record and reproduce the content information divided by the divisional unit. For example, regardless of the restriction of the single video stream on the information recording medium, such as a conventional DVD, the plurality of stream groups can be changed and reproduced by selecting the divisional unit to be selected, as occasion demands. In other words, it looks from a user's side as if it is possible to change and reproduce the plurality of video streams, as occasion demands.

These effects and other advantages of the present invention become more apparent from the following embodiments and examples.

As explained above, according to the information recording medium of the present invention, the object information file stores therein the correspondence definition information and the unit address information. Thus, it is possible to select the divisional unit related to the desired stream group, as occasion demands, and reproduce the desired content information, as occasion demands. According to the information recording apparatus or method of the present invention, it is provided with the first and second recording devices or the first and second recording processes, respectively. Thus, it is possible to reproducibly multiplex and record the content information with it divided for each stream group. According to the information reproducing apparatus or method of the present invention, it is provided with the reading device and the reproducing device or the reading process and the reproducing process, respectively. Thus, it is possible to properly perform the reproduction on the information recording medium of the present invention. Moreover, according to the computer program of the present invention, the computer is made function as the information recording apparatus, the information reproducing apparatus, or the information recording/reproducing apparatus. Thus, it is possible to perform the efficient recording or reproduction on the information recording medium of the present invention.

BRIEF DESCRIPTION OF DRAWINGS

FIG. 13 is a diagram schematically showing one specific example of a data structure in a disc information file, in one specific example of the embodiment.

FIG. 14 is a diagram schematically showing one specific example of a data structure in the disc information file constructed in a play list information file, in one specific example of the embodiment.

FIG. 15 is a diagram schematically showing one specific example of a data structure in an AU table constructed in an object information file, in one specific example of the embodiment.

FIG. 16 is a diagram schematically showing one specific example of a data structure in a divisional unit address table constructed in the object information file, in one specific example of the embodiment.

FIG. 17 is a diagram schematically showing one specific example of a data structure in an ES map table constructed in the object information file, in one specific example of the embodiment.

BEST MODE FOR CARRYING OUT THE INVENTION

Information Recording Medium

The information recording medium of the present invention is discussed, with reference to its embodiment as well as FIG. 1 to FIG. 7. In the embodiment, the information recording medium of the present invention is applied to an optical disc capable of recording (writing) and reproducing (reading).

Figure 1:
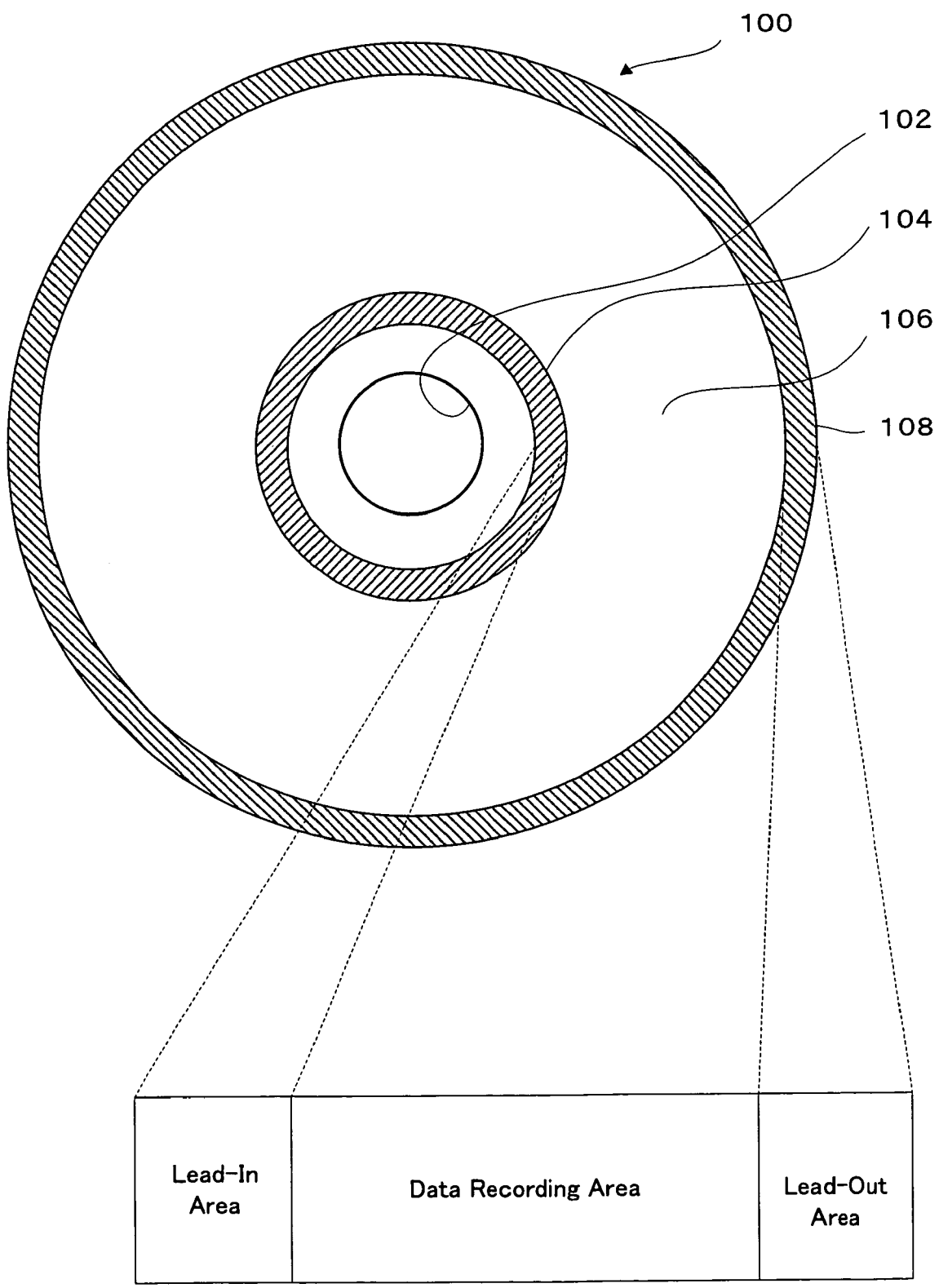
FIG. 1 is a diagram showing a basic structure of an optical disc as being one embodiment of an information recording medium of the present invention, the upper part being a schematic plan view of the optical disc having a plurality of areas, the corresponding bottom part being a schematic conceptual view of the area structure in the radial direction.

Firstly, with reference to FIG. 1, the basic structure of the optical disc in the embodiment is discussed. FIG. 1 illustrates, in its upper part, the optical disc structure having a plurality of areas in a schematic plan view, and illustrates conceptually, in its lower part, an area structure in the radius direction corresponding to the upper part.

As shown in FIG. 1, an optical disc 100 may be recorded by various recording methods, such as a magneto-optical method and a phase change method, capable of recording (writing) only once or a plurality of times. Similarly to DVDs, the optical disc 100 has a lead-in area 104, a data area 106 and a lead-out area 108, from the inner circumference around a center hole 102 to the outer circumference, on the recording surface of the disc body measuring about 12 cm in diameter. In each area, groove tracks and land tracks may be alternately arranged, concentrically or spirally, around the center hole 102. The groove tracks may be wobbled. Furthermore, pre-pits may be formed on one or both of these tracks. Incidentally, the present invention is not exclusively limited to the optical disc having three areas mentioned above.

Figure 2:
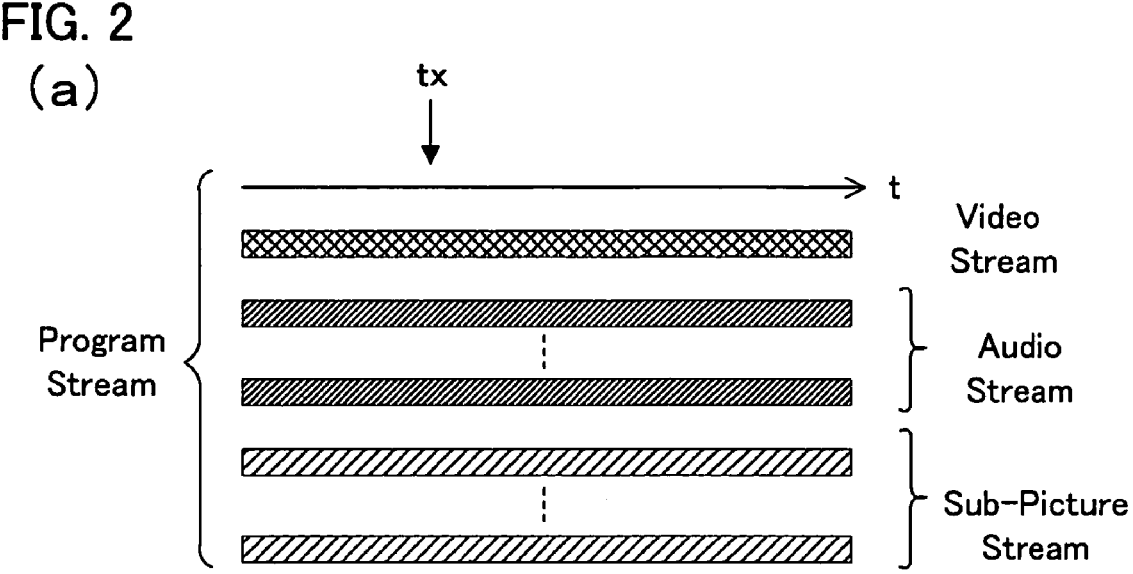
FIG. 2 are a schematic conceptual view (FIG. 2(a)) of a conventional program stream of MPEG2; and a schematic conceptual view (FIG. 2(b)) of a transport stream of MPEG2 used in the embodiment.
Figure 2:
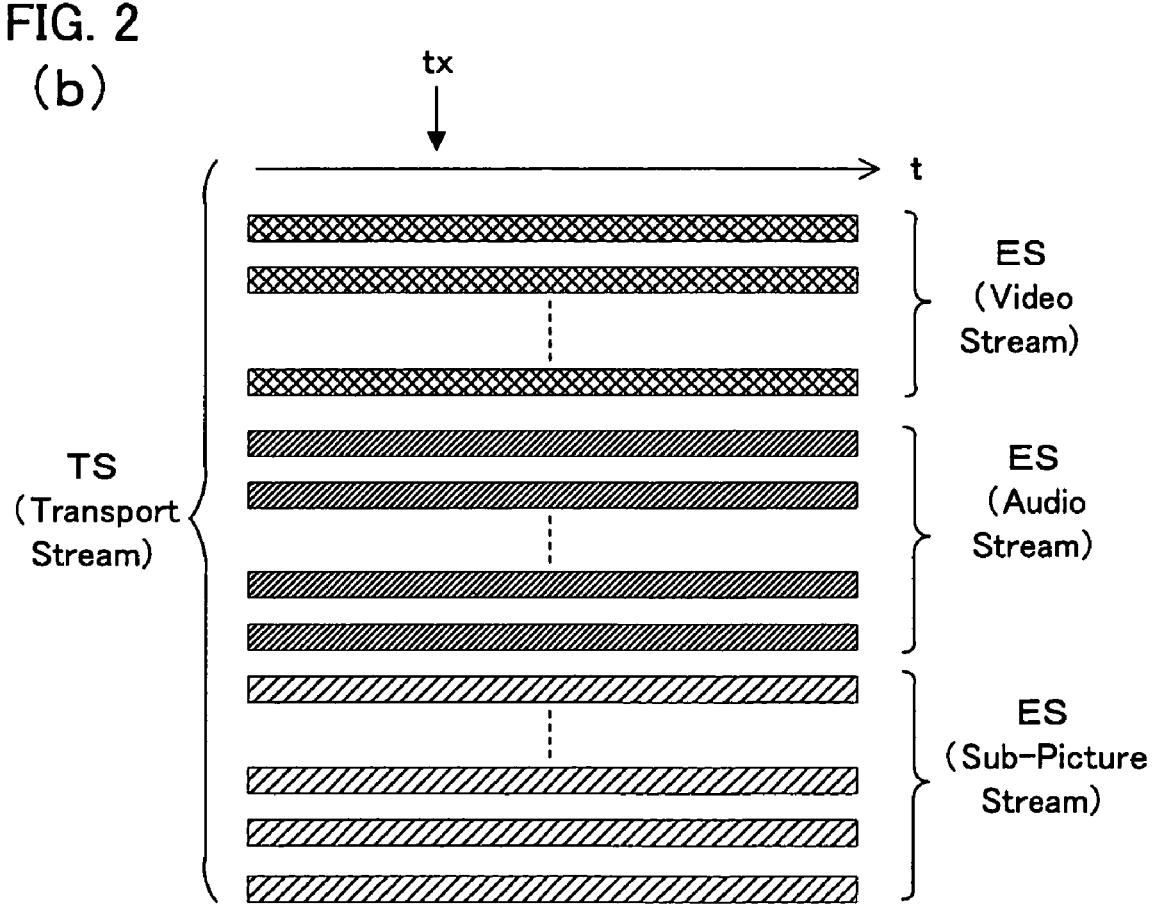

Next, with reference to FIG. 2, the structures of the transport stream (TS) and the program stream (PS) related to the optical disc in the embodiment are discussed. FIG. 2 (*a*) schematically illustrates a MPEG2 program stream structure, similar to that of a conventional DVD, with which the data recorded on the optical disc in the embodiment is compliant. FIG. 2 (*b*) schematically illustrates a MPEG2 transport stream (TS) structure, with which original data is compliant, wherein the original data is expected to be recorded onto the optical disc in the embodiment, by inputting it onto an information recording apparatus in an embodiment described later.

In FIG. 2(*a*), one program stream includes one video stream for video data as main picture information or video information, along a time axis t, and further includes up to at most 8 audio streams for audio data as audio information, and up to at most 32 sub-picture streams for sub-picture data as sub-picture information. That is, the video data to be multiplexed at an arbitrary time point tx relates to only one video stream. For example, a plurality of video streams corresponding to a plurality of TV shows or a plurality of movies can not be included at the same time in the program stream. It is not possible to multiplex a plurality of TV shows and transfer or record them in the program stream format of a DVD having only one video stream, because at least one video stream is required for each TV show, in order to transfer or record the multiplexed TV show or the like involving a video image.

According to the embodiment, however, a unique data structure, such as a divisional unit, discussed in detail later, is adopted. By this, it looks from a user's side as if it is possible to record a plurality of TV shows or the like such that they can be synchronously reproduced or switchably reproduced, as in the case where the transport stream shown in FIG. 2(*b*) is recorded as it is, even if the information recording medium is compliant with the program stream format shown in FIG. 2(*a*)

In FIG. 2(*b*), one transport stream (TS) includes a plurality of video streams as elementary streams (ES) for video data as video information, and further includes a plurality of audio streams as elementary streams (ES) for audio data as audio information and a plurality of sub-picture streams as elementary streams (ES) for sub-picture as sub-picture information. That is, the video data to be multiplexed at an arbitrary time point tx relates to a plurality of video streams. For example, a plurality of video streams that may correspond to a plurality of TV shows or a plurality of movies can be included at the same time into the transport stream. Thus, it is possible to multiplex a plurality of TV shows and transfer or record them, in the transport stream format having a plurality of video streams. However, the sub-picture stream is not transferred in digital broadcasting employing the existing transport stream.

Incidentally, for convenience of explanation, the video stream, the audio stream and the sub-picture stream are arranged in this order from the top in FIG. 2(*a*) and FIG. 2(*b*). Nevertheless, an order or sequence for multiplexing the streams by a packet unit as mentioned below is not limited to this order. In the transport stream, conceptually, a set of one video stream, two audio streams and two sub-picture streams corresponds to one program, for example.

Particularly in the embodiment, originally, i.e. at a stage as being an information source or data source which will be inputted onto an information recording apparatus according to the embodiment, the plurality of video streams (refer to FIG. 2(*b*)) are multiplexed on the time axis and transmitted in the transport stream format within a limit of a recording rate. Such video streams are recorded on the optical disc 100 in the embodiment as a plurality of video streams (refer to FIG. 2(*a*)), each of which is in the single video stream format and is divided into divisional units. In other words, on the optical disc 100, the data structure shown in FIG. 2(*a*) is constructed in each of the divisional units, and such divisional units are arranged so as to be reproduced in order. More specifically, by the information recording apparatus in the embodiment, a stream group including one video stream and at least one of the audio stream and the sub-picture stream corresponding to the one video stream is prepared by the number of the plurality of video streams transmitted in the transport stream format, and each stream group is recorded into one divisional unit corresponding thereto. Therefore, for example, even on the information recording medium corresponding only to the single video stream format (namely, the information recording medium in the single video stream structure, such as a conventional DVD), a plurality of video information transmitted in the transport stream format can be multiplexed and recorded, and properly reproduced. Then, upon reproduction, by changing or shifting the stream group to be reproduced, it is possible to change the video that a user watches.

Incidentally, the "stream group" in the embodiment is a group of elementary streams which can be reproduced as one show or program by itself, such as one movie and one TV show, including one video. The show constructed from the "stream group" may be a show constructed from a series of content information including one video, out of a title having a plurality of video, described later. Alternatively, it may be a show constructed from a series of content information related to a title having only one video. Alternatively, it may include video related to one predetermined angle, out of one show (title) including a plurality of angles.

Figure 3:
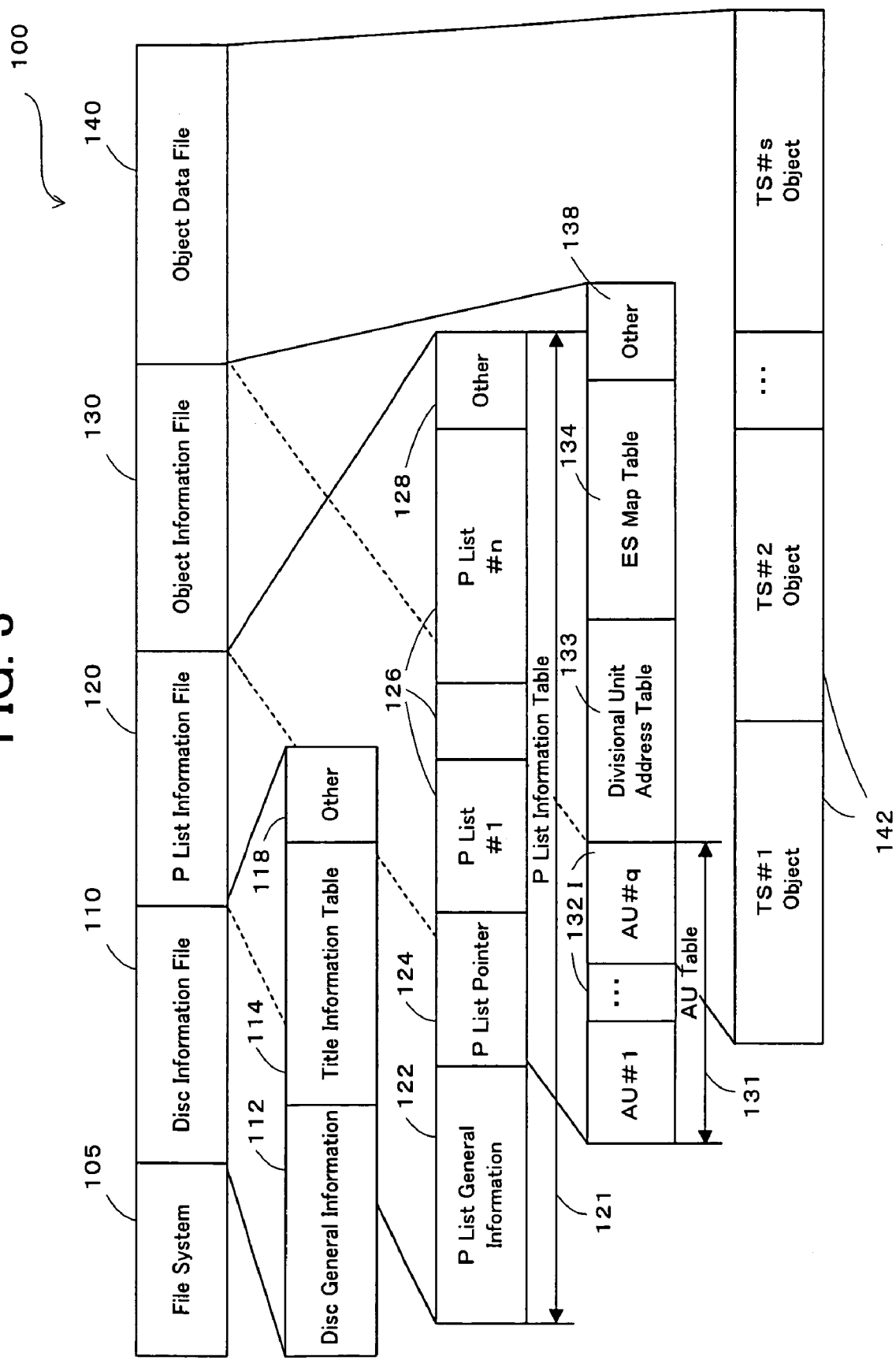
FIG. 3 is a diagram schematically illustrating a data structure recorded on the optical disc in the embodiment.
Figure 4:
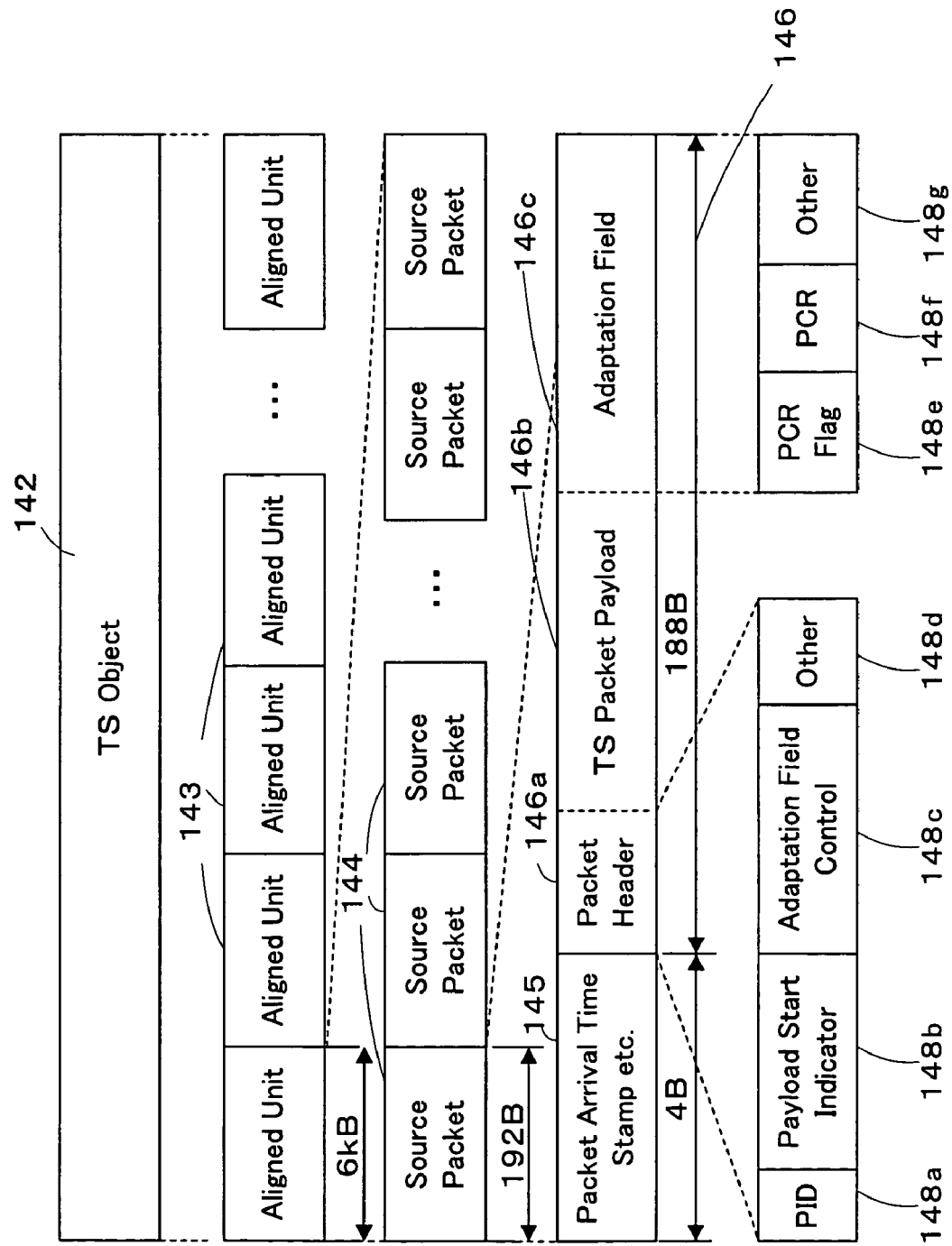
FIG. 4 is a diagram schematically illustrating a detailed data structure in each object shown in FIG. 3.

Next, with reference to FIG. 3 and FIG. 4, a structure of data to be recorded onto the optical disc 100 is discussed. FIG. 3 schematically illustrates the data structure to be recorded onto the optical disc 100. FIG. 4 schematically illustrates in detail the data structure in each object shown in FIG. 3.

In the following explanation, the "title" means a reproduction unit, on the basis of which a plurality of "play lists" are executed continuously or sequentially, and which is a logically large grouped unit, such as one movie or one TV show. The "play list" is a file for storing the information required to reproduce the "object" and consists of a plurality of "items" each storing the information about a reproduction range of the object to access the object. More specifically, in each item, "in-point information" for indicating the start address of the object and "out-point information" for indicating the end address of the object are recorded. Incidentally, each of these "in-point information" and "out-point information" may indicate the address, directly or indirectly, as a time length or time point on the reproduction time axis. The "object" is the entity information of content constituting the aforementioned MPEG2 transport stream.

In FIG. 3, the optical disc 100 is provided with four files as a logical structure: a disc information file 110; a play list (P list) information file 120; an object information file 130; and an object data file 140. The disc 100 is further provided with a file system 105 for managing these files. Incidentally, although FIG. 3 does not show directly the physical data arrangement on the optical disc 100, it is possible to perform the recording in such a manner that the arrangement shown in FIG. 3 corresponds to another arrangement shown in FIG. 1. That is, it is possible to record the file system 105 or the like into the data record area 106 following the lead-in area 104 and further record the object data file 140 or the like into the data record area 106. The file structure shown in FIG. 3 can be constructed, even without the lead-in area 104 or the lead-out area 108 shown in FIG. 1.

The disc information file 110 is a file for storing general information about the entire optical disc 100, and stores disc general information 112, title information table 114 and other information 118. The disc general information 112 may store the total quantity of titles or the like in the optical disc 100. The title information table 114 stores therein each title type (e.g. sequential reproduction type, branch type and so on) or the play list (P list) number constructing each title as the logical information.

The play list information file 120 stores a play list (P list) information table 121 indicating the logical structure of each play list. This play list information table 121 is divided into play list (P list) general information 122, play list (P list) pointer 124, a plurality of play lists (P lists) 126 (P list #1-#n), and other information 128. In this play list information table 121, the logical information of each play list 126 is stored in the order of the play list number. In other words, the order for storing the each play list 126 is the play list numbers. Furthermore, in the aforementioned title information table 114, the same play list 126 can be referred to from a plurality of titles. That is, the play list #p in the play list information table 121 may be pointed on the title information table 114, even in the case that title #n and title #m use the same play list #P.

The object information file 130 stores therein a storage position (i.e. the logical address of the reproduction object) in the object data file 140 for each item constructed in each play list 126, and/or various attribute information relating to the reproduction of the item. Particularly in this embodiment, the object information file 130 stores an AU table 131 including a plurality of AU (Associate Unit) information 132I (AU #1-#n) as mentioned below in detail, an ES (Elementary Stream) map table 134 and other information 138.

Particularly in the embodiment, the object information file 130 further stores therein a divisional unit address table 133, as one example of the "divisional unit address information" of the present invention. The structure of the divisional unit address table 133 and the way of using it will be described in detail later (refer to FIG. 16 etc.).

The object data file 140 stores a plurality of TS objects 142 (TS #1 object-TS #s object) for each stream group after the reconstruction of the transport streams (TS) into the stream group. Namely, the object data file 140 stores a plurality of entity data of content to be actually reproduced.

Incidentally, the four kinds of files discussed with reference to FIG. 3 can be further divided into a plurality of files respectively to be stored. All these files may be managed by the file system 105. For example, the object data file 140 can be divided into a plurality of files, such as object data file #1, object data file #2 and so on.

As shown in FIG. 4, the TS object 142 shown in FIG. 3, as a logically reproducible unit, may be divided into a plurality of aligned units 143 each having a data amount of 6 kB, for example. The head of the aligned units 143 is aligned with the head of the TS object 142. Each aligned unit 143 is further divided into a plurality of source packets 144 each having a data amount of 192 B. The source packet 144 is a physically reproducible unit, on the basis of which (i.e. by the unit of packet) at least the video data, the audio data and the sub-picture data from among the data on the optical disc 100 are multiplexed, and other information may be multiplexed in the same manner. Each source packet 144 includes control information 145 having a data amount of 4 B to control the reproduction, such as the packet arrival time stamp or the like, indicating the reproduction start time point of the TS (Transport Stream) packet on the reproduction time axis, and includes a TS packet 146 having a data amount of 188 B. The TS packet 146 has a packet header 146a at the head portion of a TS packet payload 146b. The video data may be packetized as "video packet", the audio data may be packetized as "audio packet", or the sub-picture data may be packetized as "sub-picture packet", otherwise other data may be packetized. Moreover, the TS packet 146 has an adaptation field 146c. Incidentally, the TS packet 146 may not include the TS packet payload 146b but may include the adaptation field 146c, or may not include the adaptation field 146c but may include the TS packet payload 146b. Alternatively, the TS packet 146 may include the both.

The packet header 146a includes: a Packet Identification (PID) 148a; a payload start indicator 148b; an adaptation filed control 148c; and other information 148d. The PID 148a stores therein an identification number for identifying the packet of the TS packet 146. The payload start indicator 148b stores therein information indicating whether or not the TS packet 146 includes the head of a Packetized Elementary Stream (PES) packet. The adaptation filed control 148c stores therein information indicating whether or not each of the TS packet payload 146b and the adaptation field 146c exists in the TS packet 146.

The TS packet payload 146b includes the content information or the like, which is the entity information of the TS packet 146, for example. In other words, the entity information of the video data, the audio data, or the sub-picture data is recorded, for example.

Moreover, the adaptation field 146c includes: a Program Clock Reference (PCR) flag 148e; a PCR 148f; and other information 148g. The PCR flag 148e stores therein flag information indicating whether or not a PCR value is stored in the adaptation field 146c. The PCR 148f stores therein the PCR value. The PCR indicates a reference time used in the reproduction of the coded video data or the like after decoded by a decoder or the like, for example.

In the embodiment, the video data, the audio data, the sub-picture data and the like in the transport stream format having the structure that includes the plurality of video streams, as shown in FIG. 2(b), are packetized into the TS packets 146 shown in FIG. 4, and recorded in the format having the single video stream structure.

Figure 5:
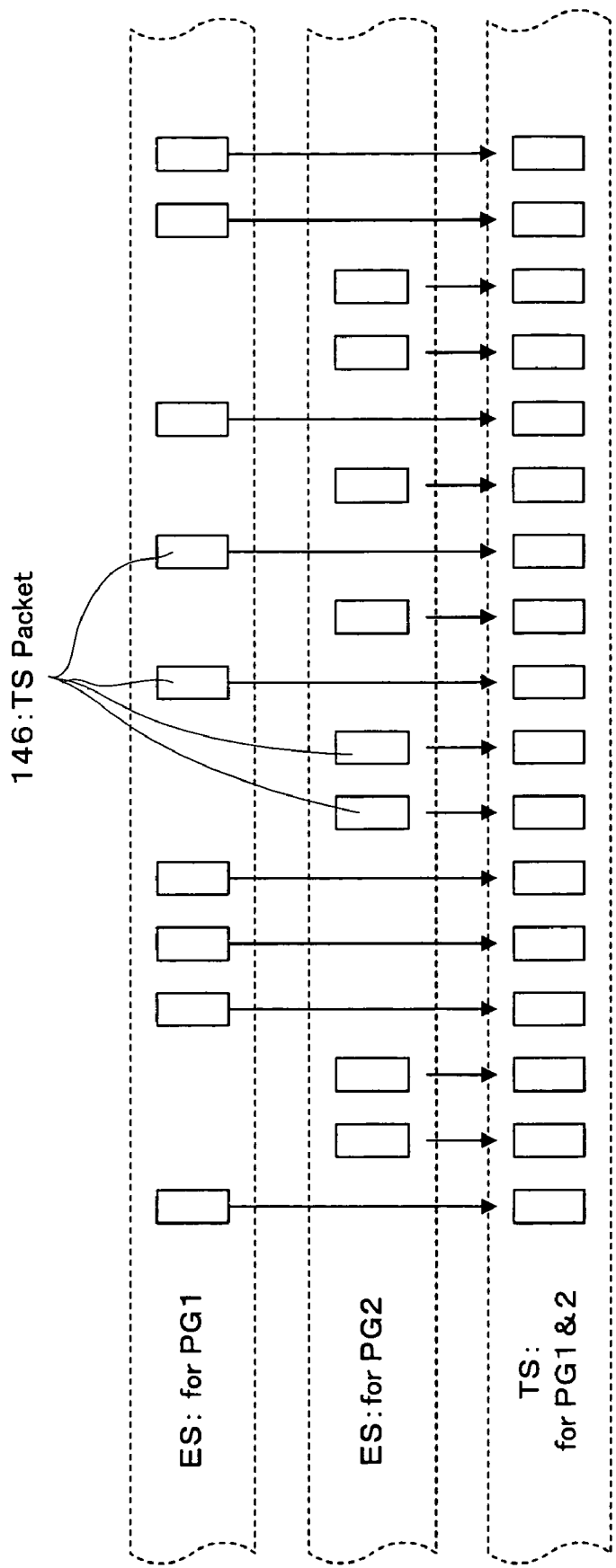
FIG. 5 is a view conceptually illustrating a situation that an elementary stream for a program #1, shown at the top, and an elementary stream for a program #2, shown in the middle, are multiplexed to form a transport stream for these two programs, on the basis of a time axis in a horizontal direction.
Figure 6:
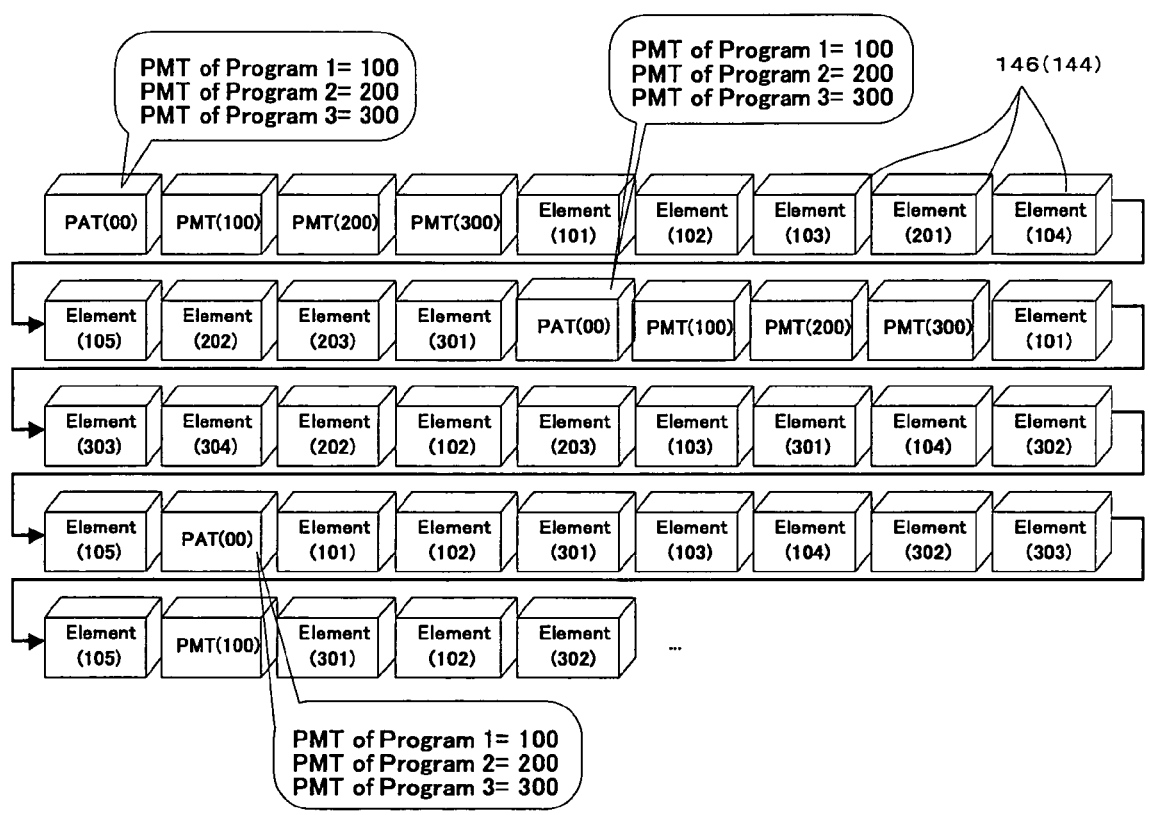
FIG. 6 is a conceptual view conceptually illustrating an image of TS packets multiplexed in one transport stream in the embodiment, as a packet arrangement based on the time axis.

Next, with reference to FIG. 5 and FIG. 6, an explanation is given on such a situation that the video data, the audio data, the sub-picture data and the like are packetized by the TS packet 146 shown in FIG. 4 in the transport stream format as shown in FIG. 2(b). FIG. 5 conceptually illustrates a situation that an elementary elementary stream (ES) for a program #2 (PG2), shown in the middle, are multiplexed to form a transport stream (TS) for these two programs (PG1&2), on the basis of a time axis in a horizontal direction. FIG. 6 conceptually illustrates an image of the TS packets multiplexed in one transport stream (TS), as a packet array along the time.

As shown in FIG. 5, the elementary stream for the program #1 (at the top) may be formed by discretely arranging TS packets 146, obtained by packetizing the video data for the program #1, along the time axis (the horizontal axis). The elementary stream for the program #2 (in the middle) may be formed by discretely arranging TS packets 146, obtained by packetizing the video data for the program #2, along the time axis (the horizontal axis). Then, these TS packets 146 are multiplexed, so that the transport stream (at the bottom) for the two programs is made. Incidentally, the elementary stream made of TS packets obtained by packetizing the audio data and the sub-picture stream made of TS packets obtained by packetizing the sub-picture data are omitted for convenience of explanation in FIG. 5. But in fact, as the elementary stream for the program #1, the elementary stream made of TS packets obtained by packetizing the audio data and the sub-picture stream made of TS packets obtained by packetizing the sub-picture data may be also multiplexed similarly, as shown in FIG. 2(b). In addition to this, as the elementary stream for the program #2, the elementary stream made of TS packets obtained by packetizing the audio data and the sub-picture stream made of TS packets obtained by packetizing the sub-picture data may be also multiplexed similarly.

As shown in FIG. 6, in this embodiment, a plurality of TS packets 146 multiplexed in this manner forms one TS stream. Then, the TS stream from the plurality of TS packets 146 multiplexed in this manner is converted to a form of the stream group, as described later, and multiplexed and recorded onto the optical disc 100, with the information such as the packet arrival time stamp 145 being added. Incidentally, in FIG. 6, the TS packet 146 consisting of the data forming program #i (i=1, 2, 3) is indicated by "Element (i0j)", wherein, j (j=1, 2, . . . ) is a sequential number for each stream constituting the program. This (i0j) is defined as a packet ID which is an identification number of the TS packet 146 for each elementary stream. This packet ID is fixed at an inherent value for a plurality of TS packets 146 to be multiplexed at the same time point, so that the plurality of TS packets 146 are distinguished from each other even if multiplexed at the same time point.

Furthermore, in FIG. 6, a PAT (Program Association Table) and PMTs (Program Map Tables) are also packetized by the TS packet 146 unit and multiplexed. The PAT among them stores a table indicating a plurality of PMT packet IDs. Particularly, the PAT is defined by MPEG2 standard so that (000) is given as a predetermined packet ID, as shown in FIG. 6. That is, from among a plurality of packets multiplexed at the same time point, the TS packet 146 obtained by packetizing the PAT is detected, as the TS packet 146 whose packet ID is (000). The PMT stores a table indicating the packet ID for each elementary stream forming each program in one or more programs. Any packet ID can be given to the PMTs, however, their packet IDs are indicated by the PAT detectable with the packet ID (000) as mentioned above. Therefore, among a plurality of packets multiplexed at the same time point, the TS packets 146 obtained by packetizing the PMTs (i.e. TS packets 146 to which packet IDs (100), (200) and (300) are given in FIG. 6) are detected on the basis of the PAT.

In the case that the transport stream as shown in FIG. 6 is transferred digitally, the tuner refers to the PAT and the PMT constructed in this manner and thereby extracts the multiplexed packets corresponding to the desired elementary stream and decodes the extracted packets.

In this embodiment, these PAT and PMT are included as the TS packets 146 to be stored in the TS object 142 shown in FIG. 4. That is, when the transport stream as shown in FIG. 6 is transferred, the transferred stream can be directly recorded onto the optical disc 100, as the stream group as it is, without any consideration of the presence of the PAT or PMT, which is a great advantage. In other words, it is possible to treat the PAT or PMT similarly to one portion of the TS packets constituting the stream group, and record it onto the optical disc 100.

Furthermore in this embodiment, these PAT and PMT recorded in this manner are not referred to upon reproduction of the optical disc 100. Instead, referring to the AU table 131 and the ES map table 134, shown in FIG. 3 and mentioned in detail later, makes it possible to perform the reproduction more effectively and apply to the complicated multi-vision reproduction or the like. For this, in this embodiment, a relationship between packets and the elementary stream obtained by referring to the PAT and the PMT on decoding or recording for example is stored in the object information file 130, in a form of AU table 131 and ES map table 134, without packetizing or multiplexing.

Figure 7:
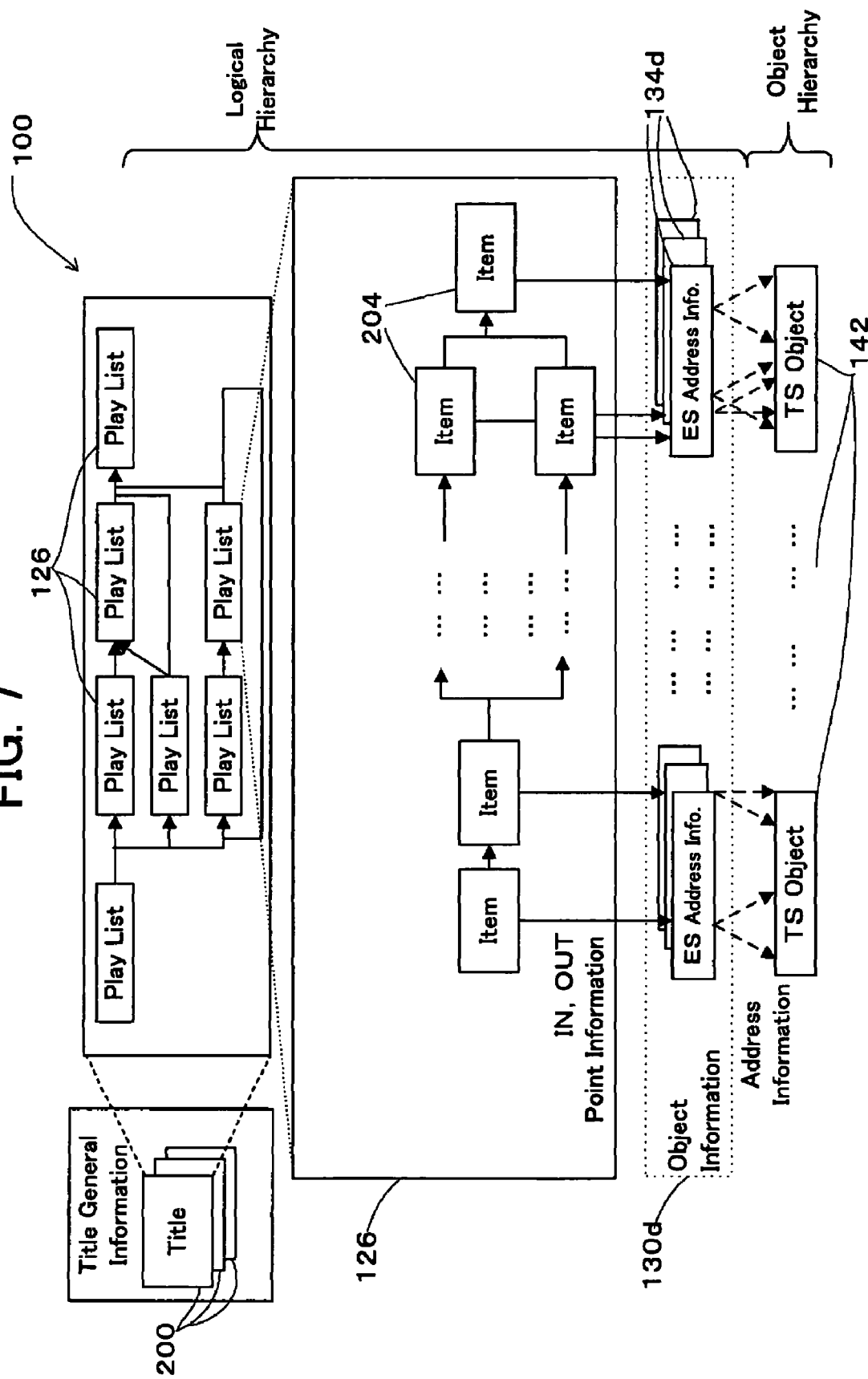
FIG. 7 is a view schematically illustrating a logical structure of data on an optical disc in the embodiment, focusing on development from a logical hierarchy to an object hierarchy or an entity hierarchy.

Next, with reference to FIG. 7, the logical structure of data on the optical disc 100 is discussed. FIG. 7 schematically illustrates the logical structure of data on the optical disc 100, focusing on the development from the logical hierarchy to the object hierarchy or the entity hierarchy.

In FIG. 7, one or more titles 200 that are a logically large unit such as one movie or one TV show are recorded on the optical disc 100. Each title 200 logically consists of one or a plurality of play lists 126. In each title 200, the plurality of play lists may have a sequential structure or may have a branch structure.

Incidentally, in the case of a simple logical structure, one title 200 consists of one play list 126. Furthermore, it is possible to refer to one play list 126 from the plurality of titles 200.

Each play list 126 is logically made of a plurality of items (play items) 204. In each play list 126, a plurality of items 204 may have the sequential structure or may have the branch structure. On the other hand, it is possible to refer to one item 204 from a plurality of play lists 126. The aforementioned in-point information and out-point information recorded on/in the item 204 logically designates the reproduction range of the TS object 142. Then, the object information 130d of the logically designated reproduction range is referred to and thereby the reproduction range of the TS object 142 is physically designated, via the file system finally. Here, the object information 130d includes various information to reproduce the TS object 142, such as the attribute information of the TS object 142, ES address information 134d and the like required for the data search in the TS object 142 (Incidentally, the ES map table 134 shown in FIG. 3 includes a plurality of ES address information 134d).

Then, when an information recording/reproducing apparatus reproduces the TS object 142 as mentioned below, a physical address to be reproduced in the TS object 142 is obtained from the item 204 and the object information 130d so that a desired elementary stream is reproduced.

As described above, in this embodiment, the in-point information and out-point information recorded on/in the item 204, as well as the ES address information 134d recorded in the ES map table 134 (see FIG. 3) of the object information 130d make it possible to perform the association from the logical hierarchy to the object hierarchy in the reproduction sequence so that the elementary stream can be reproduced.

Particularly in the embodiment, the video packet, the audio packet and the sub-picture packet multiplexed as the TS packet 146 (or the source packet 144) are organized into the divisional unit which normally consists of a plurality of variable packets, divided by the divisional unit, and recorded on the optical disc 100. Such a divisional unit is prepared for each assembly (i.e. each video stream) of a plurality of video packets constituting the same content information, and recorded onto the optical disc 100. Moreover, each divisional unit may include at least one of the audio packets and the sub-picture packets corresponding to the video packets included in each divisional unit. Furthermore, the address of each divisional unit is written on the divisional unit address table 133 stored in the object information file 130 shown in FIG. 3. Thus, it is possible to specify the address of each divisional unit by referring to the divisional unit address table 133 upon reproduction. Therefore, as described later, it is possible to select and reproduce the divisional unit including the desired video packets, as occasion demands, which constitute the elementary stream designated by the ES map table 134.

Incidentally, in FIG. 5 and FIG. 6, the source packet 144 is obtained by appending the packet arrival time stamp 145 or the like to the TS packet 146 (refer to FIG. 4). It is unnecessary to distinguish the both, in considering the order and arrangement and the like of packets to be multiplexed.

Because of such a data structure, the titles 200 shown in FIG. 7 can be recorded onto the optical disc 100, as occasion demands, by the corresponding divisional unit for each title 200 or for each video stream related to each title 200. A user can select it and reproduce a desired title 200, as occasion demands. In other words, it is possible to change and reproduce the plurality of video data, as occasion demands.

In addition, at least one of the titles 200 shown in FIG. 7 may have not only a reproduction period when video information related to a video image or scene (i.e. one angle) viewed from one view point is reproduced, but also a reproduction period when a plurality of video information related to a video image or scene viewed from a plurality of view points, i.e. a plurality of angles are reproduced. The plurality of video information related to the plurality of angles can be recorded onto the optical disc 100, as occasion demands, by the divisional unit including, for each video information, at least one of the audio information and the sub-picture information corresponding to each of the plurality of video information. Then, a user can select a desired divisional unit, to thereby perform "angle reproduction (multi-angle reproduction)" in which the plurality of angles are seamlessly changed, as occasion demands.

Consequently, even on the optical disc which can include one video stream in accordance with the single video stream format, such as a conventional DVD, it looks from a user's side as if it is possible multiplex and record the plurality of video streams. Moreover, by the user's operation, it is possible to change and reproduce each of the content information (e.g. a plurality of TV shows and the like) related to the plurality of video streams, as occasion demands.

The structure of the divisional unit and the specific structure of the divisional unit address table 133 and the like will be discussed in detail later.

(Specific Example of Data Structure Related To Divisional Unit)

Next, with reference to FIG. 8 to FIG. 12, the data structure of the TS object 142 when a plurality of video streams are recorded by the divisional unit in the embodiment will be explained by giving a specific example.

Figures 8, 9, 10:
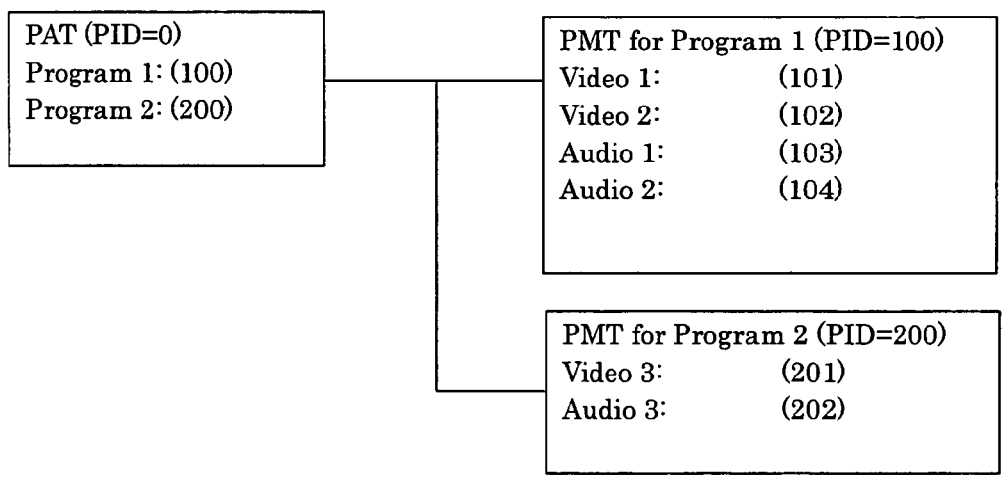
FIG. 8 is a conceptual view schematically showing a specific example of the data structure of a TS object, in the embodiment.
FIG. 9 is a diagram schematically showing a data structure if the TS object is constructed from one program, in the specific example.
FIG. 10 is a diagram schematically showing the data structure of the TS object, finally constructed on the optical disc, in the specific example.
Figure 11:
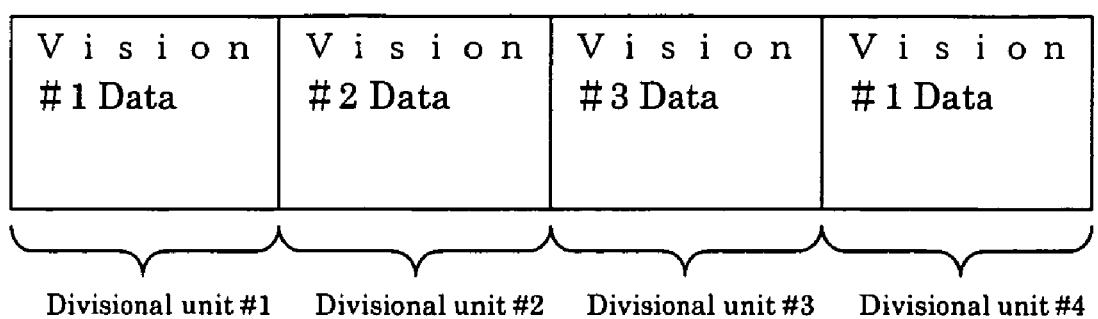
FIG. 11 is a schematic diagram conceptually showing one structure of divisional units, constructed on the optical disc, in the embodiment.
Figure 12:
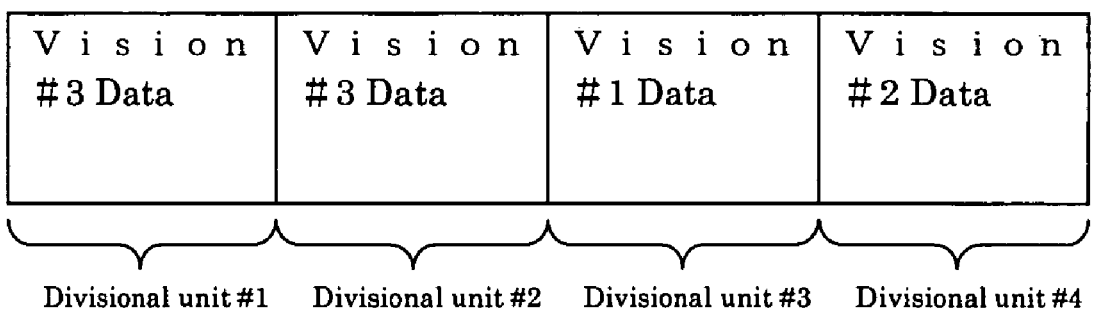
FIG. 12 is a schematic diagram conceptually showing another structure of the divisional units, constructed on the optical disc, in the embodiment.

In the specific example, two programs compliant with the transport stream format (refer to FIG. 2(b)) are recorded onto an optical disc compliant with the single video stream format (refer to FIG. 2(a)). FIG. 8 schematically shows the data structure of the two programs as being original data to be recorded, which is compliant with the transport stream format in the specific example. FIG. 9 conceptually shows a data structure indicated by the PAT and PMT of the two programs. FIG. 10 schematically shows the logical structure of data constructed on the optical disc 100 if the plurality of video streams are multiplexed and recorded, which is compliant with the single video stream format in the specific example. FIG. 11 schematically shows one example of the physical structure of the data recorded onto the optical disc 100. FIG. 12 schematically shows another example of the physical structure of the data recorded onto the optical disc 100.

As shown in FIG. 8, the two programs (i.e. "show 1" and "show 2") included in the data which is original data to be recorded onto the optical disc 100 are provided with video streams (Video 1 to 3) and audio streams (Audio 1 to 3). In each stream, there is a given packet ID for each elementary stream (ES_PID), as described above, such as "101", "102", and so on. The two programs are broadcasted, for example, by a BS digital broadcasting station in the transport stream format, and received, for example, by a BS digital tuner or the like, by which they are recorded onto the optical disc 100 or watched by a user.

Incidentally, each of the "show 1" and the "show 2" may indicate a channel in broadcasting, for example. For example, the "show 1" may be a movie broadcasted by a channel #10 broadcasting station, and the "show 2" may be a Japanese news program broadcasted by a channel #11 broadcasting station. In this case, the show 1 includes the two elementary streams (Video 1 and 2) as the video data, including two video images in which angle change can be performed, and the show 1 includes the two elementary streams (Audio 1 and 2), as the audio data, including a Japanese sound and an English sound. The show 2 includes the elementary stream (Video 3) as the video data including a video image related to the news program, for example, and the show 2 includes the elementary stream (Audio 3) as the audio data including the audio information of the Japanese news, for example.

The TS object of the original data, shown in FIG. 8, adopts a MPEG program structure, shown in FIG. 9. In other words, one PAT (whose ES_PID is defined as "000") allows two PMTs (whose ES_PIDs are defined as "100" and "200") to be specified. Moreover, the PMTs allow the packet IDs of all the elementary streams (ES_PIDs) to be specified.

Here, for example, onto an optical disc, such as a conventional DVD, the content information (i.e. the video data, the audio data, and the sub-picture data) is recorded in the program stream format. Namely, the TS object data (e.g. the show 1) including the plurality of video data compliant with the transport stream format, as shown in FIG. 8 and FIG. 9, cannot be multiplexed and recorded onto the optical disc, as it is, because it has a restriction of the single video stream.

Thus, on the optical disc 100 as being the information recording medium in the embodiment, the stream structure in the transport stream format, shown in FIG. 8 and FIG. 9, is converted (i.e. reconstructed) to a stream structure having a logical structure shown in FIG. 10, for example, and the recording is performed by the divisional unit. By this, it is possible to solve the above-mentioned problem.

In other words, as shown in FIG. 10, as the logical structure on the optical disc 100 in the embodiment, such a data structure is provided that there is constructed a title #1 provided with the play list #1 (P list #1) which designates one Item (Item #1) 204. Moreover, in the Item, there are constructed three Vision #n (n=1, 2, 3) (i.e. the above-mentioned stream group) having the same data structure as that of the program stream. The Vision #1 is a stream group including the elementary streams constituting the Video 1, Audio 1, and Audio 2. In the same manner, the Vision #2 is a stream group including the elementary streams constituting the Video 2, Audio 1, and Audio 2. The Vision #3 is a stream group including the elementary streams constituting the Video 3 and Audio 3.

The three Visions #n (n=1, 2, 3) are each divided by the divisional unit having an identification number and recorded on the optical disc 100. Namely, data relating to only one Vision (i.e. one stream group) is recorded in one divisional unit. The correspondence relationship between the Vision #n and the plurality of divisional units is recorded as a divisional unit address table, described later (refer to FIG. 16 etc.), for example.

As discussed later, an information recording/reproducing apparatus continuously accesses the divisional unit related to the desired Vision, to thereby perform the reproduction processing of the content information. Thus, in a certain processing unit (e.g. a program (PG) in the MPEG transport stream or a Video Object (VOB) as being the entity information on a DVD), it is possible to perform the reproduction processing of the content information, in accordance with the program stream format. On the other hand, it is possible to change and reproduce the content information related to the desired Vision, as occasion demands, by changing the divisional unit related to the reproduction, by a user's operation, for example.

Consequently, by recording the transport stream shown in FIG. 2(b) as the stream group having the logical structure shown in FIG. 10, it looks from a user's side as if it is possible to perform the multiplex recording and synchronous reproduction of the plurality of video streams, even on the conventional DVD having such a restriction that only the presence of the program stream (i.e. the single video stream) is allowed, as shown in FIG. 2(a). Incidentally, recording and reproduction operations on the information recording/reproducing apparatus will be discussed in detail later (refer to FIG. 18 to FIG. 27).

Incidentally, as can be seen from FIG. 10, the two elementary streams related to the Audio 1 and Audio 2 are recorded as a part of one stream group recorded into the divisional unit related to the Vision #1, and redundantly recorded even as a part of another stream group recorded in the divisional unit related to the Vision #2. Therefore, the amount of the object data recorded onto the optical disc 100 increases, as compared to that of the original data, with respect to the redundant portion.

Next, an explanation will be given on an aspect in which the stream group having the logical structure shown in FIG. 10 is recorded onto the optical disc 100, with reference to FIG. 11 and FIG. 12.

As shown in FIG. 11, a plurality of divisional units have their respective identification numbers #n (n=1, 2, 3, 4, . . . ). In this case, for example, the divisional units #1, #2 and #3 are reproduction units in which the angle change can be performed, mutually and seamlessly. The divisional units #1, #2 and #3 are recorded on the optical disc 100 to have the equal reproduction start time point and the equal reproduction end time point in predetermined content.

For example, if the Visions #1 and #2 are stream groups for indicating a movie in which the angle change can be performed, mutually and seamlessly, the video data related to one angle (the Video 1) and the audio data corresponding to the video data (the Audio1, 2) are recorded into the divisional unit #1. Moreover, the video data related to another angle (the Video 2) which can be mutually changed with the one angle and the audio data corresponding to the video data (the Audio1, 2) are recorded into the divisional unit #2. In this case, the divisional unit #1 and the divisional unit #2 are preferably recorded to have the same reproduction start time point and the same reproduction end time point on the reproduction time axis of the content.

By this, if an instruction for angle change is given, for example, by a user's operation during the reproduction of the divisional unit #1, it is possible to perform the seamless angle change by reproducing the divisional unit #2 related to the same reproduction time point on the reproduction time axis.

In this case, moreover, it is preferable that the same audio data (i.e. Audio 1, 2) is redundantly recorded on one optical disc 100. In other words, it is preferable to redundantly record the audio data corresponding to the Video 1 and the audio data corresponding to the Video 2 onto the optical disc 100. This makes it possible to be grouping the stream group (i.e. the Visions #1 and #2) by a PU unit described later, and to reproduce the content related to the stream group, relatively easily. Moreover, even in the mutual change operation related to a plurality of stream groups, it is possible to change them over by the PU unit, and to perform the angle change, relatively easily.

Incidentally, this is not limited to the seamless angle change; however, the angle reproduction can be performed even in a non-seamless angle change.

Moreover, as shown in FIG. 12, without considering the seamless change operation, the stream group may be divided by the divisional unit having a predetermined size, and may be recorded on the optical disc 100. In this case, by selecting and reproducing the divisional units related to the same stream group, it is possible to reproduce the desired content even if the stream group is not mutually angle-changeable (i.e. even if the stream group is content related to another show).

In this case, it is possible to change the contents at a desired reproduction time point without considering the current reproduction time point of each of the contents on the reproduction time axis. Furthermore, the data size of each of the divisional units may be same or different from each other.

Moreover, in the TS objects, a plurality of elementary streams which make groups as contents, such as the video stream, the audio stream and the sub-picture stream, constituting one movie, for example, are grouped into PUs (Presentation Units). Furthermore, the plurality of PUs which are groups in which the angle change can be mutually performed or not performed are grouped as an AU (Association Unit). In other words, the angle change or the non angle change can be performed, relatively easily, by specifying the elementary streams which belong to different PU in the range of the same AU. Incidentally, information about which elementary stream belongs to which PU, and which PU belongs to which AU, specifically, is written in the AU information 132I (refer to FIG. 3) in the AU table 131. The detailed structure of the AU table will be discussed in detail later.

Particularly in the embodiment, one PU corresponds to one stream group, and a plurality of stream groups to be recorded onto the optical disc 100 corresponds to one AU. Namely, the angle change or the non angle change can be mutually performed in the plurality of stream groups which belong to the same AU, so that it looks from a user's side as if it is possible to perform the multiplex recording and synchronous reproduction of the plurality of video streams.

(Specific Example of Data Structure Related to Each Information File)

Next, with reference to FIG. 13 to FIG. 17, the data structures of the various information files constructed on the optical disc 100 in the embodiment, i.e., (1) the disc information file 110, (2) the play list information file 120, and (3) the object information file 130, discussed with reference to FIG. 3, will be discussed by using their own specific examples.

(1) Disc Information File:

At first, with reference to FIG. 13, the disc information file 110 will be discussed in detail by using one specific example. FIG. 13 schematically shows one specific example a data structure in the disc information file 110.

In this specific example, as shown in FIG. 13, the disc information file 110 stores therein the disc general information 112, the title information table 114, and the other information 118.

Among them, the disc general information 112 is general or comprehensive disc information, such as disc volume information, indicating the serial number of series constructed on a plurality of optical discs 100, and total title quantity information, for example.

The title information table 114 stores therein all the play lists constituting each title, and other information, e.g. information for each title, such as chapter information within the title and the like. And the title information table 114 includes title pointer information and title #1 information. Here, the "title pointer information" is the storage address information of the title #1 information, i.e. the storage address information indicating the storage position of the title #1 information in the title information table 114, as the correspondence is shown with arrows in FIG. 13. The "title pointer information" is written with a relative logical address. Incidentally, the data amount of each storage address information may be a fixed byte or a variable byte.

In the embodiment, particularly as shown in FIG. 13, the title pointer includes other information about the title #1, such as a title type indicating the type of the above-mentioned divisional unit constituting the title #1, in addition to the storage address information. The title type is flag information indicating whether the title #1 is an angle-changeable-type title or a non-angle-changeable-type title, or flag information indicating whether the title #1 is a title for performing the seamless change or a title for performing the non-seamless change, or the like. An information recording/reproducing apparatus described later refers to the title type, by which it is possible to judge whether or not the angle change or the seamless change can be performed, relatively easily.

Moreover, in the title #1 information, there are recorded the head P list number of the title #1 and other information about the P list In addition, there may be also recorded other P list numbers in the title #1 and other information about the other P lists.

The other information 118 is information about each title, such as the title type, e.g., the sequential type, the branch type, and the like, and the total number of play lists.

(2) Play List Information File:

Next, with reference to FIG. 14, the play list information file 120 will be discussed in detail by using one specific example. FIG. 14 schematically shows one specific example of a data structure on the play list information table 121 constructed in the play list information file 120.

In this specific example, as shown in FIG. 14, the play list information file 120 stores therein the play list general information 122, the play list pointer table 124, and the play list #1 information table 126, for each Field type, as the play list information table 121 (refer to FIG. 3).

Each Field may have a structure that allows the necessary number of respective tables to be appended. For example, if there are four play lists, the relevant Field may increase to four Fields under this structure, and so does the Item information table.

Among them, in the play list general information (P list general information) 122, there are described the size of the play list table, the total quantity of play lists, and the like.

The play list pointer table (P list pointer table) 124 stores therein the address of the position where each play list is written as being the relative logical address in the play list information table 126, as the correspondence is shown with arrows in FIG. 14.

The play list #1 information table (P list #1 information table) 126 stores therein general or comprehensive information about the play list #1, the Item information table of the play list #1 (P list Item information table) and other information.

The "Item information table" stores therein the Item information by the total quantity of Items constituting one program list. Here, an AU number in the AU (Associate Unit) table written in the "Item #n (Item #1 information)" is the AU number of an AU which stores information for specifying the address of the TS object to be used for the Item reproduction, or for specifying each elementary stream (i.e. the video stream, the audio stream, or the sub picture stream) in the TS object to be used for the Item reproduction. Moreover, in the Item information, there may be stored the PU number of a PU in default reproduction which belongs to the AU.

(3) Object Information File:

Next, with reference to FIG. 15 to FIG. 17, the object information file 130 will be discussed in detail by using one specific example. FIG. 15 schematically shows one specific example of the data structure on the AU table 131 (refer to FIG. 3) constructed in the object information file 130. FIG. 16 schematically shows one specific example of a data structure in the divisional unit address table 133 (refer to FIG. 3) constructed in the object information file 130. FIG. 17 schematically shows one specific example of a data structure in the Elementary Stream (ES) map table (ES_MAP Table) 134 constructed in the object information file, in association with the AU table 131.

In this specific example, as shown in FIG. 15 to FIG. 17, the object information file 130 stores therein an object information table. The object information table consists of the AU table 131 (refer to FIG. 15), the divisional unit address table 133 (refer to FIG. 16), and the ES map table 134 (refer to FIG. 17).

The AU table 131 stores therein "AU table general information" in which the quantity of AUs and a pointer to each AU, and the like are written, and "other information" in which the storage position of the ES map table 134 is written.

In the AU table 131, there are described the Index number (Index number= . . . ) of the corresponding ES map table 134, as the AU information 132I indicating an ES table Index #1 (ES_table Index #1) in each PU #m corresponding to each AU #n. Here, the "AU" is a unit of grouping the plurality of elementary streams, such as the video streams, in the TS object to be used for one title, as described above, and it includes one or more PUs, each of which is a reproduction unit. More specifically, the AU is a unit of grouping the elementary stream packet IDs (ES_PIDs) written on the ES map table 134 (refer to FIG. 17) for each TS object, indirectly through the PUs. Each of the PUs which belongs to the same AU is a group of one or more elementary streams which constitute a plurality of shows or programs which can be mutually changed by a user's operation upon reproduction, for example. The ES table Index # corresponding to each PU is specified by PU information 302I. The PU is preferably a unit corresponding to the above-mentioned stream group, for example. If angle-reproducible contents are constructed in the AU, the AU stores a plurality of PUs, and each PU stores pointers to a plurality of elementary stream packet IDs for indicating packets constituting the content at each angle. This indicates an index number in the ES map table 134, described later.

Alternatively, even if the plurality of PUs (i.e. the AU) are constructed not by the angle-reproducible contents, namely, even if the plurality of PUs are constructed by non-angle-reproducible contents, the AU table shown in FIG. 15 is provided, and it is possible to change a plurality of shows to be reproduced, as occasion demands, between or among contents corresponding to the plurality of PUs.

Particularly in the embodiment, each AU information 132I includes divisional unit information indicating the position or the like of the divisional address table 133 (refer to FIG. 16) corresponding to the AU. Using the divisional unit information makes it possible to access the divisional unit address table 133, relatively easily, in reproducing the packets corresponding to each PU. Therefore, it is possible to specify the storage position on the optical disc 100 of a group of packets corresponding to each PU (i.e. the divisional unit). In other words, by virtue of the PU information 302I, it is possible to specify the storage position of the divisional unit address table 133 described later, at the same time of accessing the ES map table 134. Moreover, on the basis of "using divisional unit number information" written on the ES map table 134, discussed later, it is possible to reproduce the desired divisional unit, quickly and easily. Then, changing the PU to be reproduced, as occasion demands, makes it possible to change and reproduce video, such as the angle reproduction.

Then, as shown in FIG. 16, the divisional unit address table 133 stores therein "general information", a plurality of divisional units #k (k=1, 2, . . . , n), and "other information, for each Field.

In the "general information", there are written the type of the divisional unit, the total quantity of divisional units, and the like. The type of divisional units is written as, e.g., the flag information, as described above, which can identify whether the divisional unit is recorded in the angle-changeable way (refer to FIG. 11) or in the non-angle-changeable way (refer to FIG. 12), or in the seamless changeable way or in the non-seamless changeable way. Moreover, if the type of the divisional unit is recorded in the angle changeable way, the quantity of angles may be also recorded together.

Particularly in the embodiment, in the "divisional unit #k", there are written a "head address" indicating an address where the head of the divisional unit is written, a "divisional unit length" indicating the data size of the divisional unit, "other information" and the like. By referring to the "head address", it is possible to access the divisional unit, relatively easily.

Moreover, an identifiable number (i.e. #1, #2, . . . ) is assigned to each divisional unit. Then, as discussed later, it is possible to access each divisional unit, relatively easily, by virtue of "using divisional unit number information 134b" written on the ES map table 134.

In FIG. 17, the ES map table 134 stores therein ES map table general information, a plurality of Indexes #m (m=1, 2, . . . ), and "other information", for each Field.

In the "ES map table general information", there are written the size of the ES map table, the total quantity of Indexes, and the like.

The "Index #1" includes the elementary stream packet ID (ES_PID) of the elementary stream to be used for the reproduction and the address information of the elementary stream.

Particularly in the embodiment, the "using divisional unit number information 134b" are further included as well as "address information 134a" as being the address information of the elementary stream, for each Index, in the ES map table 134 in FIG. 17.

The "using divisional unit number information 134b" is information indicating continuous numbers or serial numbers given in a predetermined data range, such as an optical disc, each title, and each TS object, as the numbers of the divisional units constituting the divided reproduction section. In the "using divisional unit number information 134b", the divisional unit numbers are preferably arranged and written in the reproduction order of the divisional units. Then, by referring to the "using divisional unit number information 134b", it is possible to refer to the "head address" or the "divisional unit length" of each divisional unit, written on the divisional unit address table 133 (refer to FIG. 16).

Incidentally, the "using divisional unit number information 134b" may be not the divisional unit numbers, but may be addresses where the actual divisional units are stored (e.g. the head address). This allows for quick access to the divisional unit without accessing the divisional unit address table. Incidentally, even in this case, the addresses where the divisional units are stored are preferably arranged and written in the reproduction order of the divisional units, in the "using divisional unit number information 134b".

In the embodiment, a packet number (SPN) and a display start time point corresponding thereto may be written, as the address information 134a. If the elementary stream is the MPEG 2 video stream as mentioned above, only the address of the TS packet at the head of an I picture may be written in the ES map table 134 as the address information 134a, to thereby reduce the data amount.

By virtue of such construction, it is possible to obtain the elementary stream packet ID (ES_PID) of the actual elementary stream from the Index number of the ES map table 134 designated from the AU table 131. Moreover, the address information 134a of the elementary stream corresponding to the elementary stream packet ID (i.e. ES address information) can be obtained at the same time, it is possible to reproduce the object data on the basis of these information.

Incidentally, the ES_PID which is not referred to from the AU table 131 in FIG. 15 may be written for each Index of the ES map table 134 in FIG. 17, which is not described in FIG. 15 to FIG. 17. If the more versatile ES map table 134 is prepared by writing the ES_PID not to be referred to, there is an advantage that it is unnecessary to reconstruct the ES map table when content is reedited, such as when authoring is performed again, for example.

(Information Recording/Reproducing Apparatus)

Figure 18:
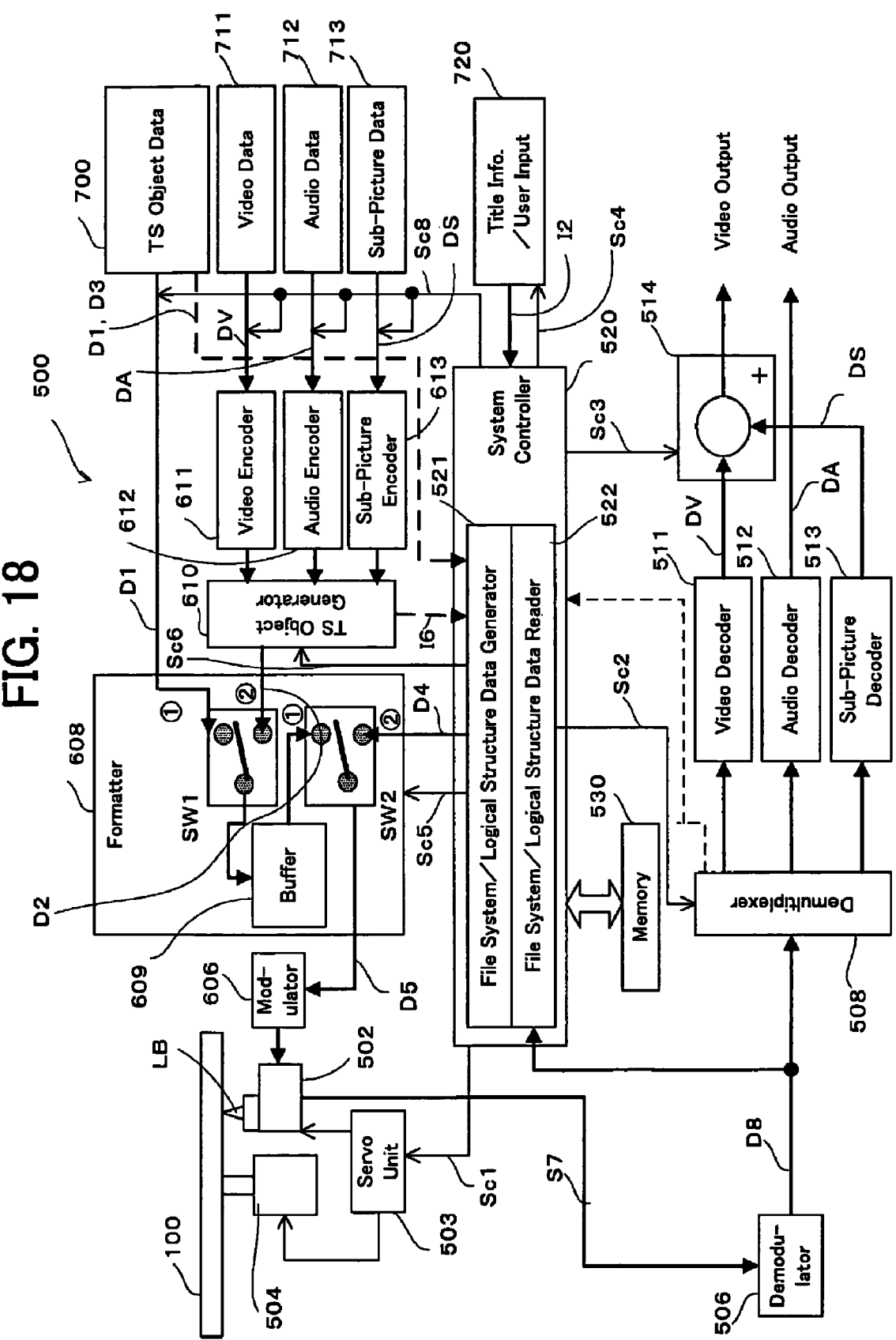
FIG. 18 is a block diagram schematically illustrating an information recording/reproducing apparatus in the embodiment of the present invention.
Figure 19:
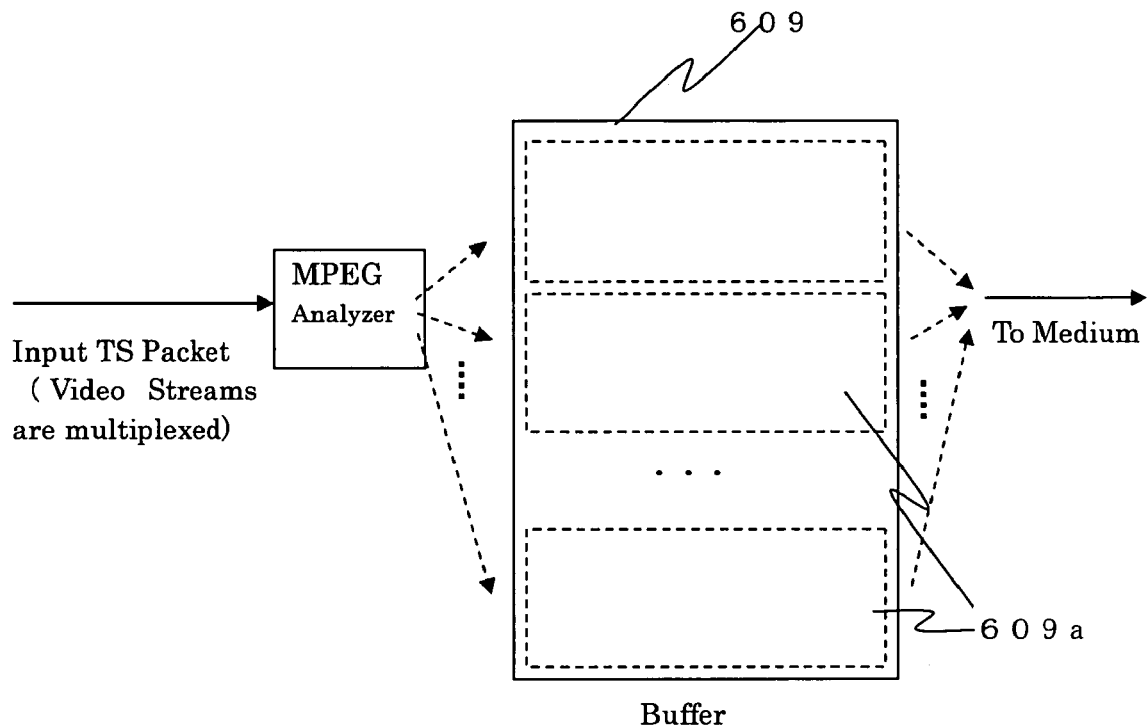
FIG. 19 is a schematic diagram conceptually showing the operation principle of a buffer in the embodiment.

Next, with reference to FIG. 18 to FIG. 26, an embodiment of the information recording/reproducing apparatus of the present invention is discussed. Here, FIG. 18 is a block diagram showing the information recording/reproducing apparatus. FIG. 19 is a schematic diagram conceptually showing a recording operation on a formatter of the information recording/reproducing apparatus, and FIG. 20 to FIG. 26 are flowcharts showing the details of a recording or reproduction operation by the divisional unit.

In FIG. 18, an information recording/reproducing apparatus 500 is broadly divided into a reproduction system and a record system. The information recording/reproducing apparatus 500 is constructed to record the information onto the optical disc 100 mentioned above and reproduce the information recorded thereon/therein. In this embodiment, the information recording/reproducing apparatus 500 is thus for recording and reproduction. Nevertheless, an embodiment of the information recording apparatus according to the present invention can be constructed basically with the record system of the information recording/reproducing apparatus 500 and an embodiment of the information reproducing apparatus according to the present invention can be constructed basically with the reproduction system of the information recording/reproducing apparatus 500.

The information recording/reproducing apparatus 500 is provided with: an optical pickup 502; a servo unit 503; a spindle motor 504; a demodulator 506; a demultiplexer 508; a video decoder 511; an audio decoder 512; a sub-picture decoder 513; an adder 514; a system controller 520; a memory 530; a modulator 606; a formatter 608; a TS object generator 610; a video encoder 611; an audio encoder 612; and a sub-picture encoder 613. The system controller 520 includes a file system/logical structure data generator 521 and a file system/logical structure data reader 522. Furthermore, the memory 530 and a user interface 720 to give a user input, such as title information, are connected to the system controller 520.

Among these constitutional elements, the demodulator 506, the demultiplexer 508, the video decoder 511, the audio decoder 512, the sub-picture decoder 513, the adder 514 mainly constitute the reproduction system. On the other hand, among these constitutional elements, the modulator 606, the formatter 608, the TS object generator 610, the video encoder 611, the audio encoder 612 and the sub-picture encoder 613 mainly constitute the record system. The optical pickup 502, the servo unit 503, the spindle motor 504, the system controller 520, the memory 530 and the user interface 720 to give the user input, such as title information, are generally shared for both the reproduction system and the record system. Furthermore, for the record system, a TS object data source 700; a video data source 711; an audio data source 712; and a sub-picture data source 713 are prepared. Furthermore, the file system/logical structure data generator 521 disposed in the system controller 520 is used mainly in the record system, and the file system/logical structure reader 522 is used mainly in the reproduction system.

The optical pickup 502 irradiates the optical disc 100 with a light beam LB such as a laser beam, at the first power as reading light for the reproduction, and at the second power with the light beam LB being modified as writing light for recording. The servo unit 503 performs focus servo, tracking servo and the like for the optical pickup 502, as well as the spindle servo for the spindle motor 504, under the control of a control signal Sc1 outputted from the system controller 520, during the reproduction and recording. The spindle motor 504 is controlled under the spindle servo by the servo unit 503, for rotating the optical disc 100 at a predetermined speed.

(i) Structure and Operation of Record System

Next, with reference to FIG. 18 to FIG. 22, the specific structure and the operation of each constitutional element constituting the record system of the information recording/reproducing apparatus 500 will be explained.

At first, with reference to FIG. 19, a buffer 609 located in the formatter 608 is discussed.

As shown in FIG. 19, the buffer 609 has a plurality of divisional buffers 609a into which the buffer 609 is divided in accordance with the TS object data. Each of the divisional buffers 609a corresponds to one example of the "buffer area"

of the present invention. Each divisional buffer 609a is provided for each stream group recorded onto the optical disc 100. Each of the TS packets to be inputted is buffered to respective one of the predetermined divisional buffers 609a, in accordance with the stream groups which the TS packet belongs to.

For example, it is assumed that the original data in the transport stream format shown in FIG. 8 is inputted and that the data is recorded onto the optical disc 100, as the stream groups having the logical data structure shown in FIG. 10. In this case, it is preferable to provide the divisional buffers 609a (#1., #2 and #3) corresponding to the Visions #1, #2, and #3, respectively, for the buffering.

Then, by referring to the PID 148a (refer to FIG. 4) included in the packet header 146a related to each of the inputted TS packets, it is judged to which stream group (i.e. Vision) the TS packet corresponds. The judgment about the TS packet is performed by a MPEG analyzer shown in FIG. 22, for example. The MPEG analyzer may be included in the system controller 520, for example. In this case, it may be constructed to analyze TS object data D1 inputted from the TS object data source 700, and record it into the predetermined divisional buffers 609a, for each TS packet, by using a switch control signal Sc5.

For example, if the inputted TS packet belongs to the Audio 1 (i.e. PID="103"), it is judged that PID equals to "103" by the MPEG analyzer. Thus, it is found out that the inputted TS packet can be used for the both Visions #1 and #2, so that the inputted TS packet is buffered to the divisional buffer 609a#1 corresponding to the Vision #1 and the divisional buffer 609a#2 corresponding to the Vision #2, out of the divisional buffers 609a.

Then, the TS packets are outputted from the formatter 608, as disc image data D5, by the divisional unit for each divisional buffer 609a, and recorded onto the optical disc 100.

By virtue of the buffer 609 discussed above, it is possible to divide the TS object data for each divisional unit and record it onto the optical disc 100.

Next, with reference to FIG. 20 to FIG. 22, a processing routine for recording the TS object data by the divisional unit will be discussed. Incidentally, the processing routine discussed here is a detailed operation indicating a process from the obtainment of the TS object data to the recording onto the optical disc 100.

In this case, the original TS object data may be the data inputted from the object data source 700 shown in FIG. 18. For example, it may be the TS object data broadcasted from a broadcasting station as being the object data source. Alternatively, it may be the data which is included in both the video data source 711 and at least one of the audio data source 712 and the sub-picture data source 713, which is encoded by the corresponding encoder (611 to 613) and which is inputted by the TS object data generator 610 as the TS object data. Furthermore, it may be the object data recorded on another optical disc in the transport stream format, for example.

Figure 20:
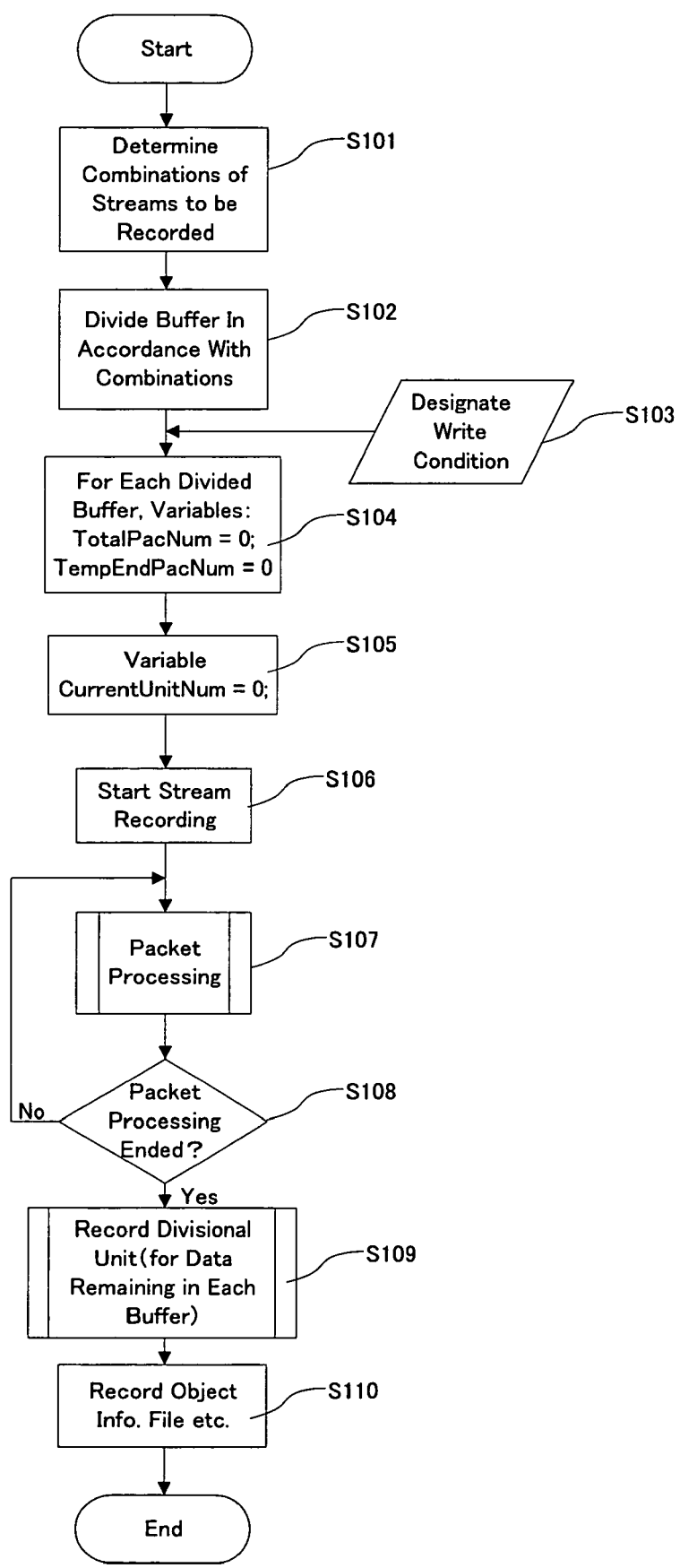
FIG. 20 is a flowchart showing an operation of preparing a divisional unit and recording by a unit of the divisional unit, on the information recording/reproducing apparatus in the embodiment.

In FIG. 20, with respect the original TS object data, the TS object data D1 is outputted, under the control of a control signal Sc8 to instruct the data reading from the system controller 520. Then, the system controller 520 imports the TS object data D1 from the TS object data source 700, and determines combinations of streams to be recorded, on the basis of the imported TS object data D1 (step S101). This may be determined from results of analysis, such as the data array analysis of the TS object data D1 (e.g. data recording) and the analysis of each elementary stream packet structure (e.g. ES_PID (elementary stream packet identification number)), which are performed on the basis of the PAT and the PMT inputted as the TS packets by the TS analysis feature in the file system/logical structure data generator 521. In other words, for example, if the TS object data shown in FIG. 8 is inputted, it is determined to record the data with the combinations of streams (i.e. the stream groups) shown in FIG. 10.

Again in FIG. 20, on the basis of the combinations of streams to be recorded which is determined in the step S101, the buffer 609 is divided into the plurality of divisional buffers 609a corresponding to their respective combinations of streams (step S102). Then, the write condition of writing the TS packets into the plurality of divisional buffers 609a is designated (step S103). The write condition designates whether the TS packets are recorded onto the optical disc 100 as the angle-changeable divisional unit, or the non-angle-changeable divisional unit. In addition, the write condition may designate a condition for recording the TS packets from the divisional buffers 609a to the optical disc 100 (i.e. a trigger to start the recording).

Then, "0" is assigned, as an initial value, to a "TotalPacNum" indicating the quantity of the TS packets recorded and to a "TempEndPacNum" indicating the TS packet number of the last TS packet out of the data (i.e. the TS packets) written from the divisional buffers 609a to the optical disc 100 at a time, for the respective plurality of divisional buffers 609a divided in the step S102, (step S104). Moreover, "0" is assigned, as an initial value, to a "CurrentUnitNum", indicating the total quantity of the divisional units recorded on the optical disc 100 (i.e. how many divisional units are prepared) (step S105). These variables may be recorded in the system controller 520, for example.

After the above-mentioned initial setting, the recording operation of recording the streams constituting the TS object data D1 into the buffer 609 is started (step S106). Incidentally, a switch Sw1 in the formatter is switching-controlled by a switch control signal Sc5 from the system controller 520. If the TS object data is supplied from the TS object data source, the switch Sw1 is connected to a ①side. Moreover, if the TS object data is supplied from the TS object generator 610, the switch Sw1 is connected to a ② side.

The TS object data D1 imported from the TS object data source 700 is processed by the unit of TS packet (step S107). Incidentally, such packet processing will be discussed in detail later (refer to FIG. 21).

Then, it is judged whether or not the process for all the TS packets related to the imported TS object data D1 is ended (step S108).

As a result of the judgment, if the process is not ended (the step S108: No), the operational flow goes to the step S107 again, and the remaining TS packets are processed. On the other hand, the process for all the TS packets is ended (the step S108: Yes), the data remaining in the buffer 609 without satisfying the write condition is recorded onto the optical disc 100 by the divisional unit (step S109). In this case, even without satisfying the write condition, the recording of one divisional unit provided for each divisional buffer 609a can be performed on the optical disc 100, for example. Incidentally, the operation of recording the divisional unit or units in the step S109 will be discussed in detail later (refer to FIG. 22).

Lastly, the object information file (refer to FIG. 3) as being logical information file data D4 and the like, which is generated by the file system/logical structure data generator 521 included in the system controller 520, are recorded onto the optical disc 100, to thereby end the operation (step S110). Incidentally, the switch Sw1 in the formatter is switching-controlled by the switch control signal Sc5 from the system controller 520, and the switch Sw2 is connected to a ② side. Moreover, the memory 530 is used in preparing the logical information file data D4.

Incidentally, variations such as preparing in advance data about the data array of the object data D1, the structure information of each elementary stream and the like can be obviously considered. They are also in the scope of the present invention.

Next, with reference to FIG. 21, the packet processing in the step S107 in FIG. 20 will be discussed.

Figure 21:
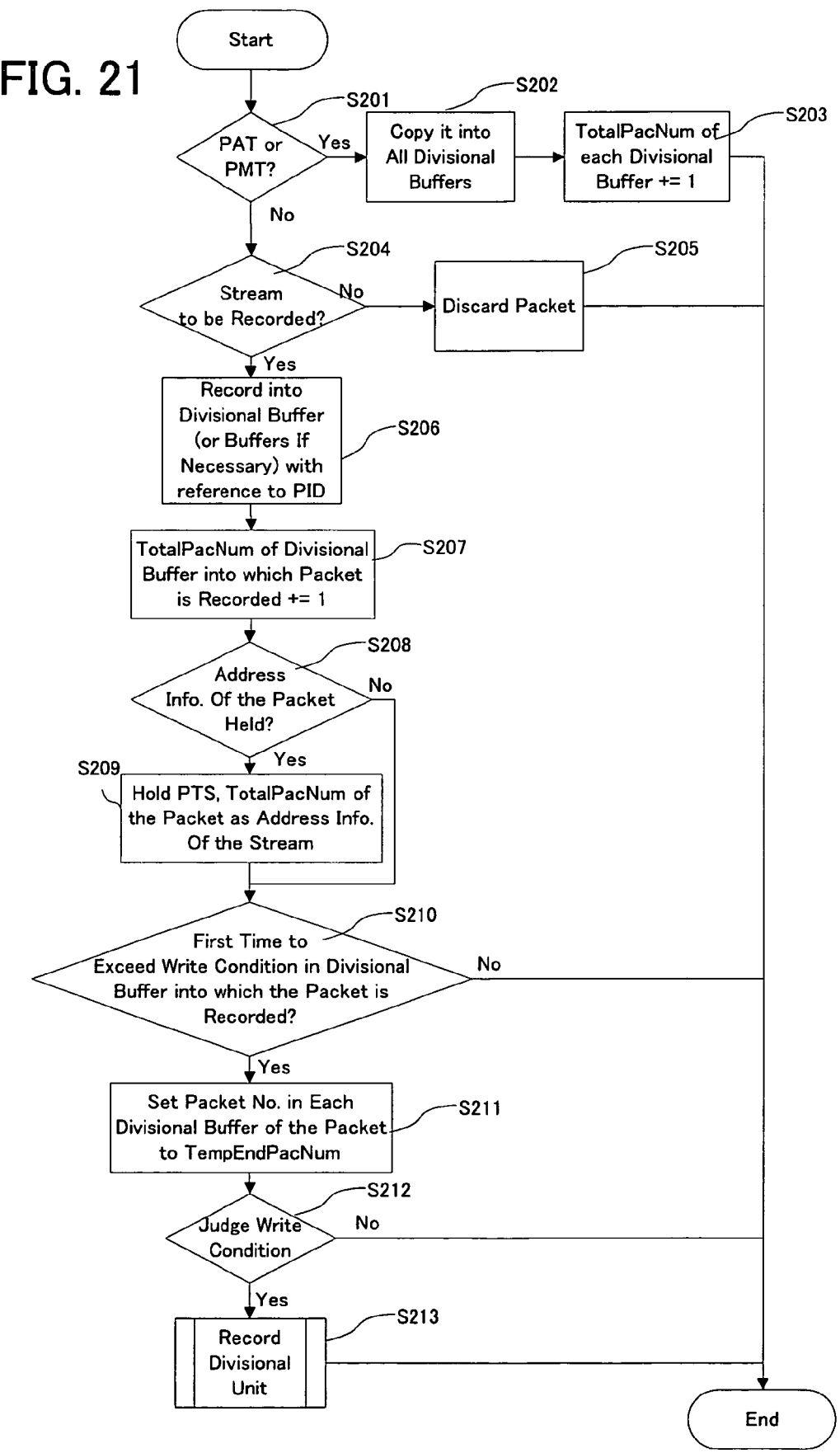
FIG. 21 is a flowchart showing an operation of packet processing in FIG. 20.

In FIG. 21, it is judged whether or not the imported TS packet is the PAT or PMT (step S201). In this case, the judgment may be also performed by referring to the PID (refer to FIG. 4) included in the header of the TS packet, for example, by the TS analysis feature of the file system/logical structure data generator 521 included in the system controller 520.

As a result of the judgment, if the imported TS packet is the PAT or PMT (the step S201: Yes), the PAT or PMT is recorded into each of the plurality of divisional buffers 609a (step S202). Then, the TotalPacNum of each divisional buffer 609a is incremented (step S203), to thereby end the packet processing. Then, the operational flow goes to the step S108 in FIG. 24.

On the other hand, if the imported TS packet is not the PAT or PMT (the step S201: No), it is judged whether or not the TS packet is included in the stream to be recorded (step S204).

As a result of the judgment, if the TS packet is not included in the stream to be recorded (the step S204: No), it is unnecessary to record the TS packet into the buffer 609, so that the packet is discard or eliminated (step S205), to thereby end the packet processing.

On the other hand, if the TS packet is included in the stream to be recorded (the step S204: Yes), the PID of the TS packet (refer to FIG. 4) is referred to, to thereby identify to which combination of streams the TS packet corresponds and record it into the corresponding one of the divisional buffers 609a (step S206). Incidentally, in this case, if the TS packet is included in two or more combinations out of the combinations of streams (i.e. two or more stream groups out of the plurality of stream groups), the TS packet is redundantly recorded into the respective divisional buffers 609a. Then, the TotalPacNum of the divisional buffer 609a into which the TS packet is recorded is incremented (step S207).

Then, it is judged whether or not the address information of the TS packet is held (step S208). This judgment is performed on the basis of whether or not the TS packet is a TS packet including the I picture related to the video stream. If it corresponds to the TS packet including the I picture, it is judged to be held, and if not, it is judged not to be held.

As a result of the judgment, if it is unnecessary to hold it (the step S208: No), the operational flow skips a step S209 and goes to a step S210.

On the other hand, if it is necessary to hold it (the step S208: Yes), the Presentation Time Stump (PTS, i.e. display time point) and the TotalPacNum of this packet are held as the ES address information 134a of this stream (refer to FIG. 17) (the step S209).

Then, it is judged whether or not it is the first time to exceed the write condition in the divisional buffer into which the TS packet is recorded (the step S210). With respect to the write condition in this case, the judgment is performed on the basis of whether or not a plurality of TS packets related to a predetermined reproduction time length are recorded, if the angle-changeable divisional unit is recorded. In other words, if the TS packets are recorded beyond the predetermined time length, it is judged to exceed the write condition. Alternatively, if the non-angle-changeable divisional unit is recorded, the judgment is performed on the basis of whether or not the TS packets are recorded beyond the recording capacity of the divisional buffers 609a. In other words, if the TS packets are recorded beyond a predetermined recording capacity, it is judged to exceed the write condition.

As a result of the judgment, if it is judged not to exceed the write condition (the step S210: No), the packet processing is ended.

On the other hand, if it is judged to exceed the write condition (the step S210: Yes), the packet number of the packet in each divisional buffer 609a is set to the TempEndPacNum (step S211), and the operational flow goes to a step S212.

Then, the write condition is further judged (namely, it is judged whether or not to satisfy the write condition) (the step S212). With respect to the write condition, if the angle-changeable divisional units are recorded, for example, the judgment is performed on the basis of whether or not each of the reproduction start time points and the reproduction end time points are mutually equal in the data recorded in the respective divisional units 609a in which the TS packets associated with the angle change are recorded, out of the plurality of divisional buffers 609a. If they are mutually equal, it is judged to satisfy the write condition, and if not, it is judged not to satisfy the write condition. Alternatively, if the non-angle-changeable divisional units are recorded, as in the step S210, it is judged whether or not the TS packets are recorded beyond the recording capacity of the divisional buffers 609a.

As a result of the judgment, if the write condition is not satisfied (the step S212: No), the TS packet processing is ended.

On the other hand, if the write condition is satisfied (the step S212: Yes), the predetermined divisional buffer or buffers 609a are recorded into the optical disc 100 (step S213), to thereby end the TS packet processing. Incidentally, the process of recording the divisional unit in the step S213 will be discussed in detail later (refer to FIG. 26).

Next, with reference to FIG. 22, the process of recording the divisional unit in the step S109 in FIG. 20 and in the step S213 in FIG. 21 will be discussed.

Figure 22:
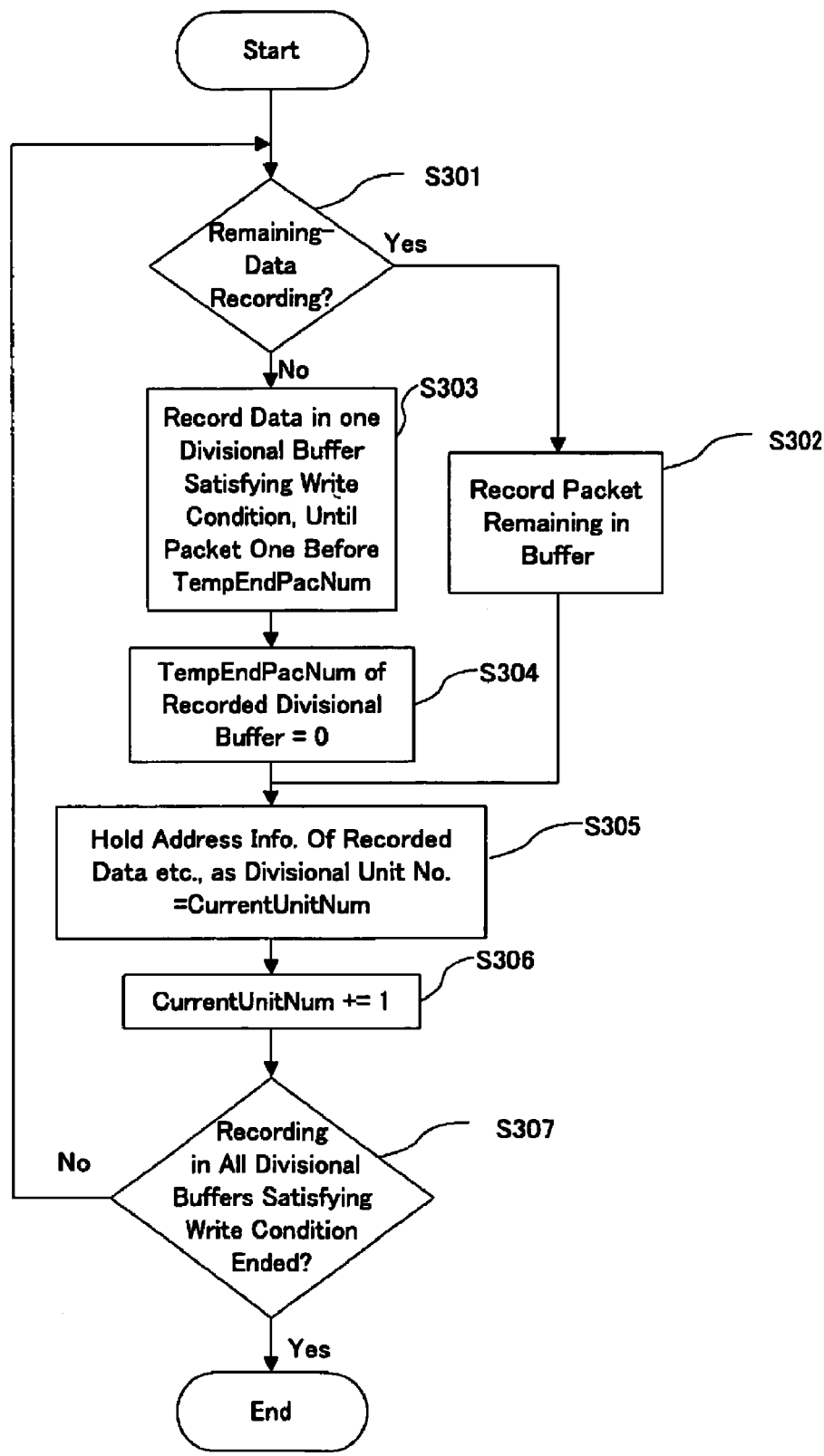
FIG. 22 is a flowchart showing an operation of recording the divisional unit in FIG. 20.

In FIG. 22, at first, it is judged whether or not the process of recording the divisional unit corresponds to the "recording of the divisional unit with respect to the data remaining in each buffer" in the step S109 in FIG. 21 (step S301).

As a result of the judgment, if the process is the recording with respect to the remaining data (the step S301: Yes), the data in the divisional buffer 609a having the data to be recorded is recorded onto the optical disc 100 (step S302). Namely, all the TS packets recorded in the divisional buffer are recorded onto the optical disc 100. Specifically, a switch Sw2 in the formatter is switching-controlled by the switch control signal Sc5 from the system controller and connected to the ① side, to thereby transmit the data as the disc image data D5 from the buffer 609 to the modulator 606. Then, it is modulated by the modulator 606 and recorded onto the optical disc 100 through the optical pickup 502. The disc recording control at this time is also performed by the system controller 520.

On the other hand, if the process is not the recording with respect to the remaining data (the step S301: No), namely, if it is the recording of the divisional unit in the step S213 in FIG. 25 (the step S301: No), the data in one divisional unit satisfying the write condition is recorded onto the optical disc 100, as one divisional unit, until a packet whose number is one before from the number of packets indicated by the TempEndPacNum (step S303). Incidentally, the recording onto the optical disc 100 is performed by the system controller 520, as in the step S302. Then, the TempEndPacNum of the divisional buffer 609 having the data recorded onto the optical disc 100 is initialized to "0" (step S304), and the operational flow goes to a step S305.

Then, the number indicated by the CurrentUnitNum is held as the identification number of the divisional unit, and the address position or the like of the data recorded on the optical disc 100 is held on the divisional unit address table 133 (refer to FIG. 16) (step S305). The data is used in preparing the logical information file data D4 in the step S110 in FIG. 20.

Then, the CurrentUnitNum is incremented (step S306), and it is judged whether or not the recording of all the divisional buffers 609a which satisfy the write condition is ended (step S307). Namely, for example, it is judged whether or not all the data recorded in the divisional buffers 609a corresponding to the angle change, for example, is recorded on the optical disc 100.

As a result of the judgment, if the recording is not ended (the step S307: No), the operational flow goes to the step S301 again, and the rest of the divisional units are recorded.

On the other hand, if the recording is all ended (the step S307; Yes), the recording process for the divisional units is ended.

As described above, the information recording/reproducing apparatus 500 in the embodiment can divide the TS object data by the divisional unit and record it onto the optical disc 100. The TS object data recorded in this manner is reproduced by the information recording/reproducing apparatus 500, as discussed below, to thereby change and reproduce a plurality of video, as occasion demands.

(ii) Structure and Operation in Reproduction System

Next, the specific structure and operation of each constitutional element constituting the reproduction system of the information recording/reproducing apparatus 500 is explained with reference to FIG. 18 and FIG. 23 to FIG. 26.

By the user interface 720, the title to be reproduced from the optical disc 100, its reproduction condition and the like are inputted to the system controller 520, as the user input 12, such as the title information and the like. In this case, under the control of the control signal Sc4 from the system controller 520, the input processing suitable for the content to be reproduced, such as selection on a title menu screen, can be achieved by the user interface 720.

Responding to this, the system controller 520 controls the disc reproduction with respect to the optical disc 100, and the optical pickup 502 transmits a reading signal S7 to the demodulator 506.

The demodulator 506 demodulates a recorded signal recorded onto the optical disc 100 from this reading signal S7, and outputs it as demodulated data D8. The logical information file data (i.e. the file system 105, the disc information file 110, the P list information file 120, and the object information file 130, shown in FIG. 3) included in this demodulated data D8 as being a not-multiplexed information part is supplied to the system controller 520. On the basis of this logical information file data, the system controller 520 executes various reproduction control, such as processing of determining a reproduction address and controlling the optical pickup 502.

On the other hand, as for the TS object data included in the multiplexed information part in the demodulated data D8, the demultiplexer 508 demultiplexes the TS object data, under the control of the control signal Sc2 from the system controller 520. Here, when the access to the reproduction position address is terminated under the reproduction control by the system controller 520, the control signal Sc2 is transmitted to start the demultiplexing.

The video packet, the audio packet and the sub-picture packet are transmitted respectively from the demultiplexer 508 and supplied respectively to the video decoder 511, the audio decoder 512 and the sub-picture decoder 513. Then, they are decoded to thereby to generate video data DV, audio data DA and sub-picture data DS, respectively.

Incidentally, although the packets obtained by packetizing the PAT or the PMT, included in the transport stream shown in FIG. 6, are included as a part of the demodulated data D8, respectively, they are discarded or abandoned at the demultiplexer 508.

The adder 514 is controlled by a control signal Sc3 giving an instruction of the mixing from the system controller 520, and mixes or superimposes in a predetermined timing the video data DV and the sub-picture data DS, which are respectively generated at the video decoder 511 and the sub-picture decoder 513. The result is outputted as a video output from the information recording/reproducing apparatus 500 to a TV monitor, for example.

On the other hand, the audio data DA decoded at the audio decoder 512 is outputted as an audio output from the information recording/reproducing apparatus 500 to an external speaker, for example.

Here, the specific example of a reproduction processing routine by the system controller 520 is explained with reference to FIG. 23 to FIG. 26.

Figure 23:
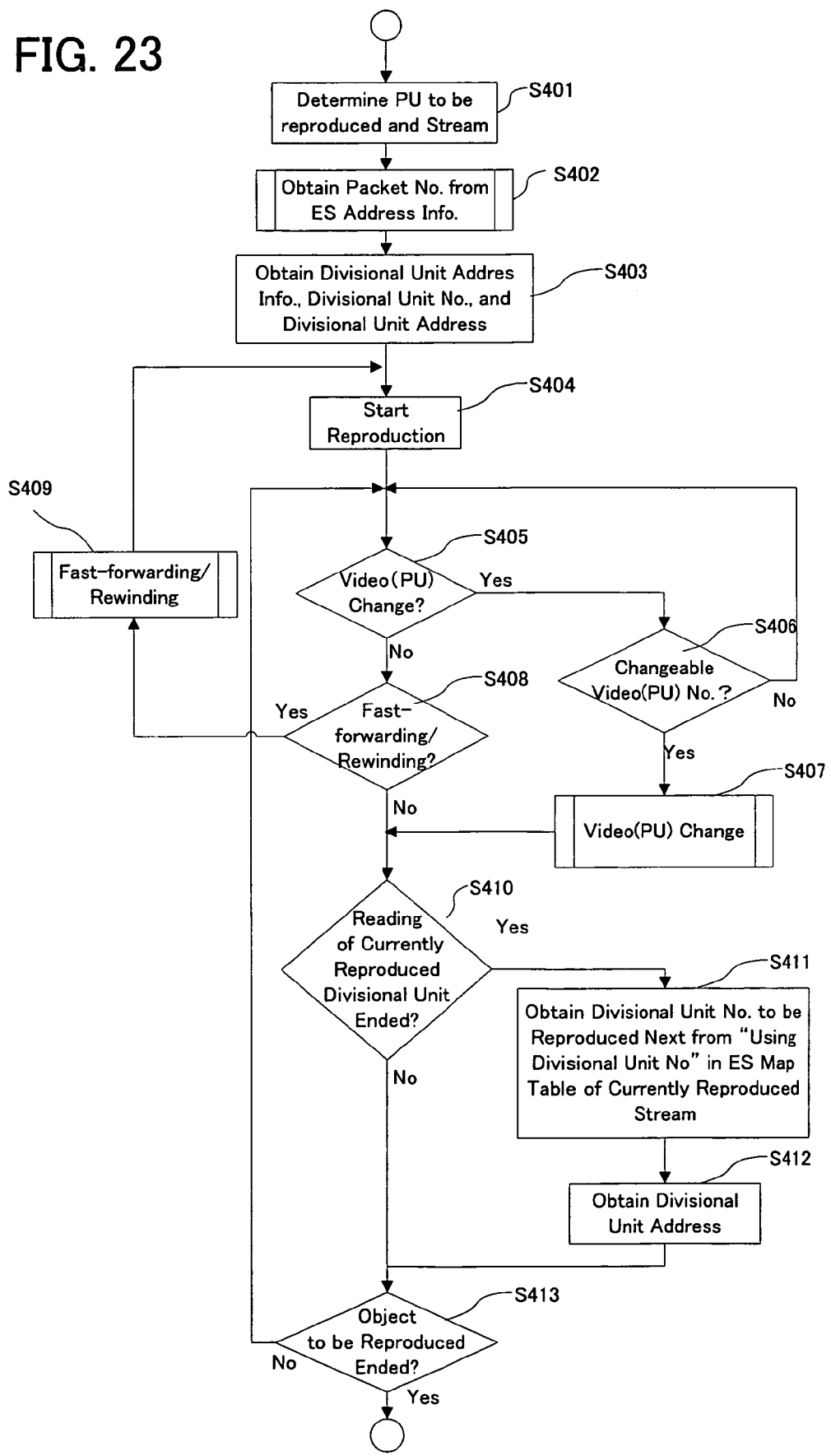
FIG. 23 is a flowchart showing the reproduction operation of the information recording/reproducing apparatus in the embodiment.

With reference to FIG. 23, an entire flow in the reproduction processing routine will be discussed.

In FIG. 23, it is assumed that as an initial condition, the recognition of the optical disc 100 in the reproduction system and the recognition of a volume structure and a file structure by the file system 105 (see FIG. 3) have been already completed by the system controller 520 and the file system/logical structure data reader 522 inside of the system controller 520. It is also assumed that one title has been already selected from the disc general information 112 in the disc information file 110 and that the obtainment of the information (the AU and PU information) about a reproduction target object has been already ended. Here, an explanation is made on the operational flow after determining the object to be reproduced.

Firstly, on the basis of the obtained information about the reproduction target object, the object to be reproduced, i.e. the PU (namely, the stream group, for example) is determined, and at the same time, the elementary streams corresponding to the PU are determined (step S401). After the determination of the PU and the elementary streams to be reproduced, the packet number related to the TS object which is the reproduction target object is obtained by the ES address information (refer to FIG. 17) included in the ES map table (step S402). Incidentally, the processing of obtaining the packet in the step S402 will be discussed in detail later, with reference to FIG. 24.

Then, on the basis of the PU to be reproduced, determined in the step S401, divisional unit address information (e.g. the "position of the divisional unit address table" included in the divisional unit information in FIG. 15), the divisional unit number of the divisional unit including the TS packet having the packet number obtained in the step S402 (e.g. the "using divisional unit number information 134b") and the divisional unit address thereof (e.g. the "head address" in FIG. 16) are obtained (step S403). Specifically, from the index number included in the PU information, the ES map table is accessed, to thereby obtain the divisional unit number and obtain the divisional unit address information written on the AU table. Then, the divisional unit address table is accessed, to thereby obtain the head address.

Then, the reproduction of the object data is started from the packet number obtained in the step S402 (step S404). Then, during the reproduction of the object, it is judged whether or not there is a command input for video change (Video/PU) by a user's operation on the information recording/reproducing apparatus (step S405).

If there is a command input for video change (the step S405: Yes), it is judged whether or not the PU including the currently reproduced content can be changed over to another PU, for example, on the basis of the AU table (refer to FIG. 15) (step S406).

As a result of the judgment, if it is not the changeable PU (the step S406: No), the operational flow returns to the step S405 without the video change processing, and the reproduction process is continued while it is judged whether or not there is the command input from the user. On the other hand, if it is the changeable PU (the step S406: Yes), the video change processing is performed (step S407), and the operational flow goes to a step S410. Incidentally, the video change processing in the step S407 will be discussed in detail later, with reference to FIG. 25.

On the other hand, in the step S405, if there is no command input for video change (the step S405: No), it is judged whether or not there is a command input for fast-forwarding or rewinding by the user's operation on the information recording/reproducing apparatus (step S408).

As a result of the judgment, in the step S408, if there is a command input for fast-forwarding or rewinding (the step S408: Yes), after fast-forwarding or rewinding processing is performed (step S409), the reproduction is started (the step S404). Incidentally, the fast-forwarding or rewinding processing will be discussed in detail later, with reference to FIG. 26.

On the other hand, in the step S408, if there is no command input for fast-forwarding or rewinding (the step S408: No), it is judged whether or not the reading of the currently reproduced divisional unit is ended (step S410).

If the reading of the currently reproduced divisional unit is not ended (the step S410: No), it is judged whether or not the object to be reproduced is ended (step S413).

As a result of the judgment, if the object to be reproduced is ended (the step S413: Yes), the series of reproduction processing is ended. On the other hand, if the object to be reproduced is not ended (the step S413: No), the operational flow returns to the step S405 again, and the reproduction processing is continued while it is judged whether or not there is the command input by the user's operation.

On the other hand, in the step S410, if the reading of the currently reproduced divisional unit is ended (the step S410: Yes), the divisional unit number to be reproduced next is obtained from the "using divisional unit number" (refer to FIG. 17) in the ES map table of the currently reproduced stream or streams (i.e. the stream group) (step S411). Then, from the obtained divisional unit number, the divisional unit address table (refer to FIG. 16) is accessed, to thereby obtain the divisional unit address (i.e. the head address, for example) (step S412). Then, the operational flow goes to the step S413 to judge whether or not the reproduction object is ended.

Next, with reference to FIG. 24, the processing of obtaining the packet number in the step S402 in FIG. 23 will be explained.

Figure 24:
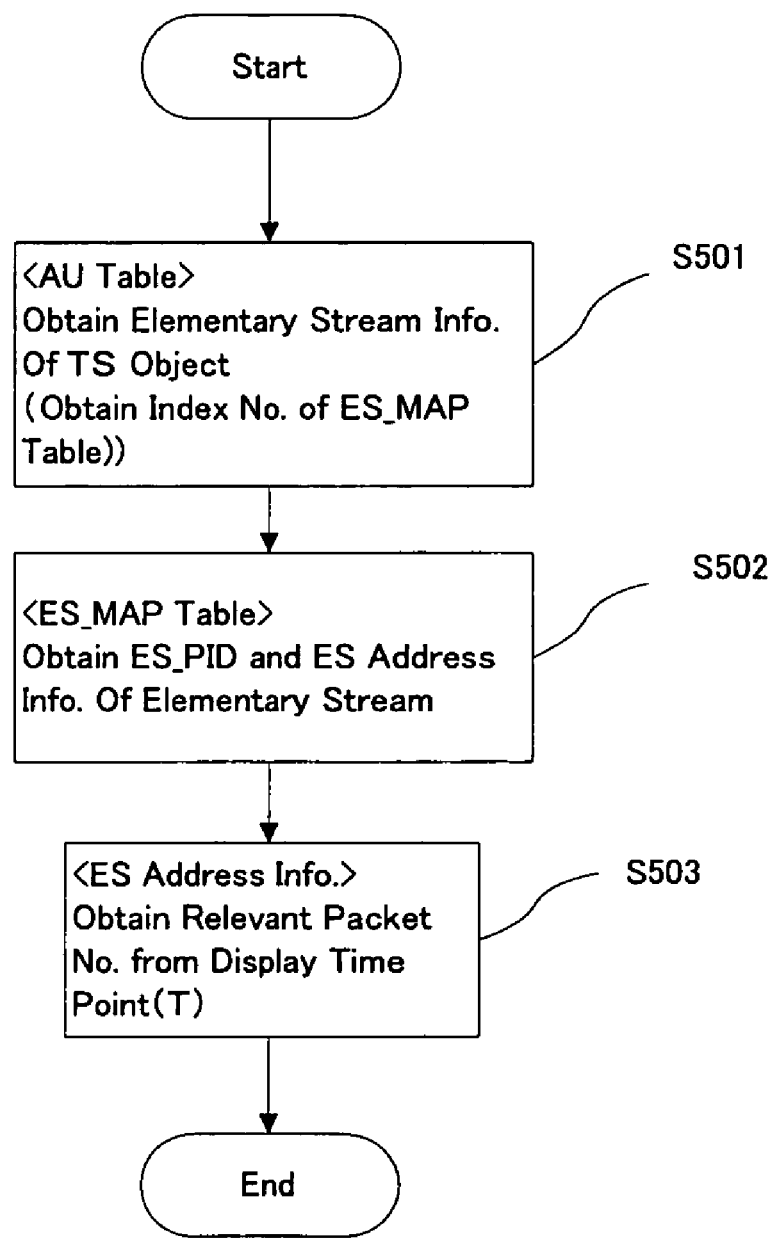
FIG. 24 is a flowchart showing a process of obtaining a packet number in FIG. 23.

In FIG. 24, at first, with reference to the AU table (refer to FIG. 15 etc.), the information related to the elementary streams of the TS object which is the reproduction target object is obtained; namely, the index number of the ES map table or the like is obtained (step S501).

Then, with reference to the ES map table (refer to FIG. 17 etc.), the packet number (ES_PID) and the ES address information of the elementary stream corresponding to the index number obtained in the step S501 are obtained (step S502).

Then, on the basis of the obtained ES address information, the relevant packet number is obtained from the display time point (T) (step S503).

Then the processing of obtaining the packet number completes.

Next, with reference to FIG. 25, the video change processing in the step S407 in FIG. 23 will be explained.

Figure 25:
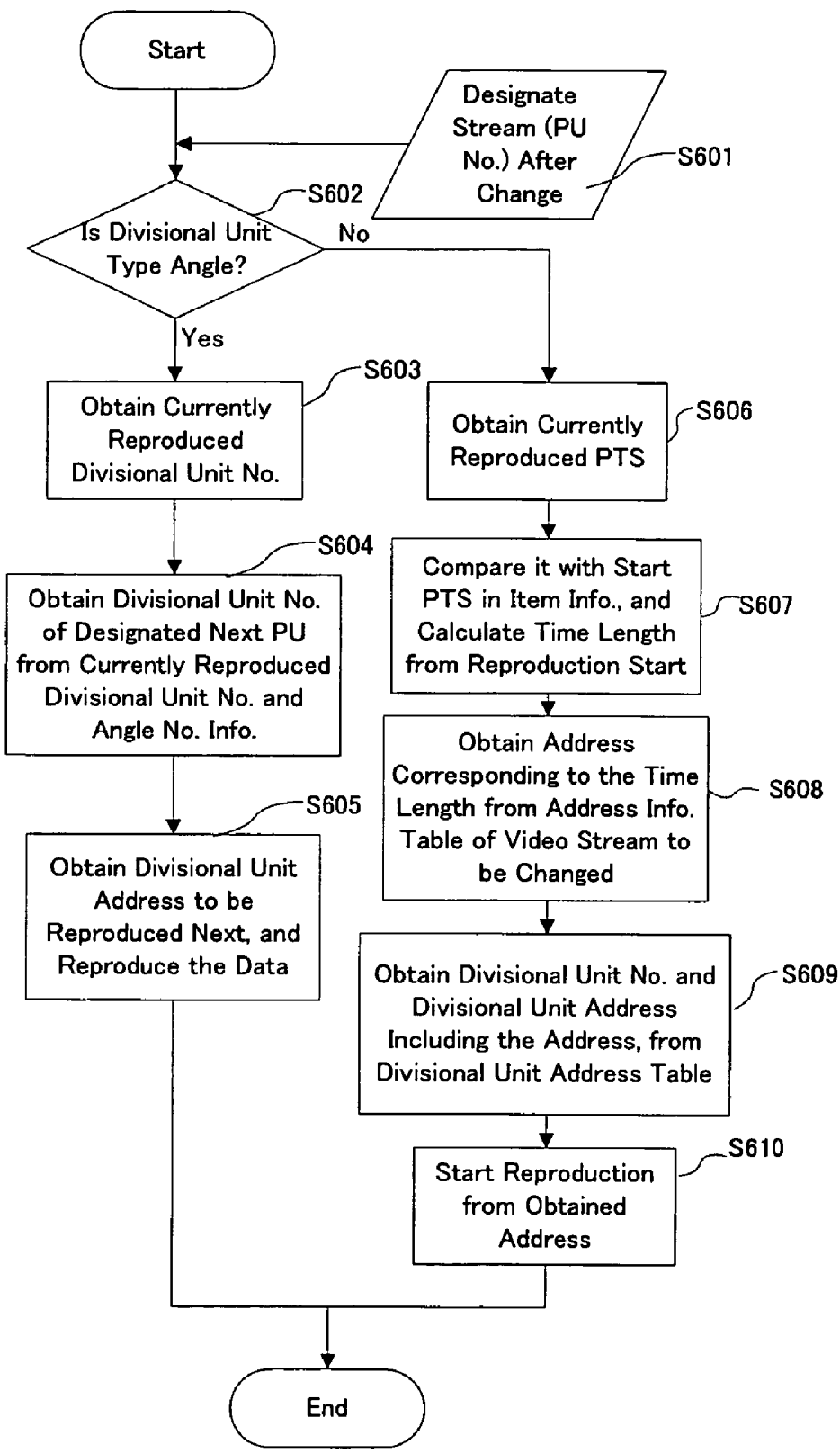
FIG. 25 is a flowchart showing a process of video change in FIG. 23.

In FIG. 25, at first, the stream after the change (or the PU number) is designated by the user's operation from the user input 720, for example (step S601). Then, it is judged whether or not the type of the divisional unit corresponds to the angle change (i.e. whether or not it is an angle type), from the general information included in the divisional unit address table 133 (refer to FIG. 16) (step S602).

As a result of the judgment, if the type of the divisional unit is the angle type (the step S602: Yes), the currently reproduced divisional unit number is obtained (step S603). Then, the divisional unit number of the designated next PU is obtained from the currently reproduced divisional unit number and angle number information written on the divisional unit address table (step S604). This divisional unit number may be obtained by calculation from the angle number information, or may be obtained from the using divisional unit number information 134b. Then, the divisional unit address to be reproduced next (i.e. the head address) is obtained, and the data related to the divisional unit indicated by the address is reproduced (step S605). By this, the user can watch different angles, seamlessly. Then, the video change processing is ended, and the operational flow goes to the step S410 in FIG. 23.

On the other hand, if the type of the divisional unit is not the angle type (namely, if it is a non-angle type) (the step S602: No), the PTS of the currently reproduced TS packet is obtained (step S606). Then, it is compared with the start PTS for indicating the reproduction start time point of the relevant Item, stored in the Item information in the play list information, to thereby calculate a time length from the reproduction start (step S607). Then, an address corresponding to the time length is obtained from the ES address information of the video stream to be changed (step S608). In other words, the address of the TS packet in the video stream to be changed is obtained which has the same reproduction time length as the time length from the reproduction start of the currently reproduced TS packet. Then, from the divisional unit address table, the divisional unit number and the divisional unit address including the address (i.e. the TS packet included in the address) are obtained (step S609). Then, the divisional unit related to the video stream after the change is reproduced from the address position obtained in the step S608 (step S610). Then, the video change processing is ended, and the operational flow goes to the step S410 in FIG. 23.

If the type of the divisional unit is not the angle type, it is also possible to perform the reproduction change to the TS packet related to a predetermined or arbitrary reproduction time length on the reproduction time axis, without reference to the PTS, as described above.

Incidentally, even if the divisional unit is the angle type, following the process from the step S606 to step S610 allows for a reasonable angle reproduction although it is not seamless.

Next, with reference to FIG. 26, the fast-forwarding and rewinding processing in the step S409 in FIG. 23 will be discussed.

Figure 26:
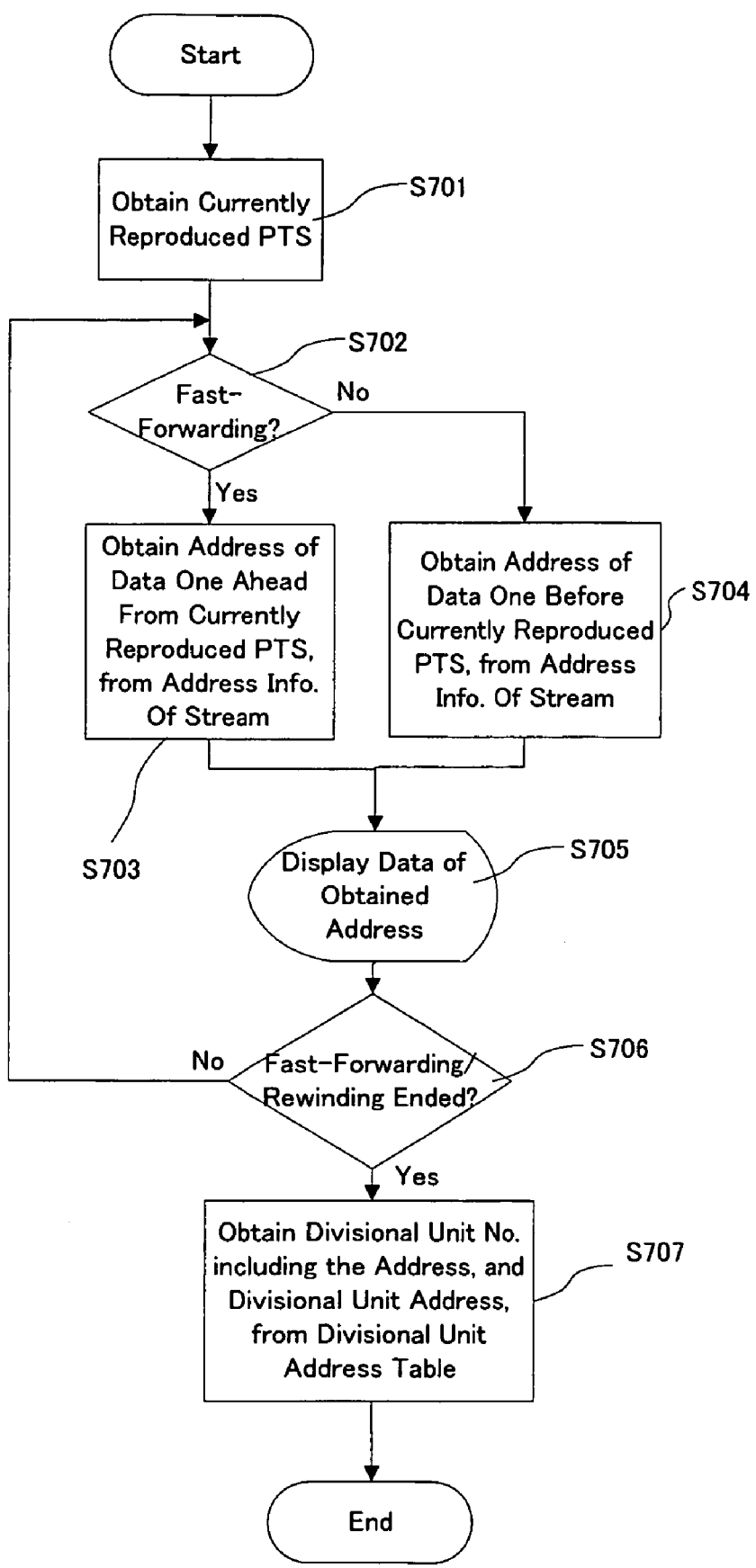
FIG. 26 is a flowchart showing a process of fast-forwarding/rewinding in FIG. 23.

In FIG. 26, the PTS of the currently reproduced TS packet is obtained (step S701). Then, it is judged whether or not there is an command input for fast-forwarding (step S702).

As a result of the judgment, if there is the command input for fast-forwarding (the step S702: Yes), the address of data (i.e. the TS packet, for example) located one ahead from the currently reproduced PTS is obtained from the address information of the stream (i.e. the ES address information) (step S703). In other words, in the currently reproduced stream, the address of the I picture located one ahead is obtained, to thereby display and output the data of the address (i.e. the video data related to the I picture) (step S705). Incidentally, since the fast-forwarding/rewinding processing is performed only with the display of the I picture, there is also an advantage that the fast-forwarding/rewinding processing can be performed with a relatively low processing load.

On the other hand, if there is no command input for fast-forwarding (the step S702: No), namely, if there is a command input for rewinding, the address of data located one before from the currently reproduced PTS is obtained from the address information of the stream (step S704). In other words, in the currently reproduced stream, the address of the I picture located one before is obtained, to thereby display and output the data of the address (i.e. the video data related to the I picture) (the step S705).

Then, it is judged whether or not the user's instruction related to the fast-forwarding/rewinding processing is continued, namely whether or not the fast-forwarding/rewinding processing is ended (step S706).

As a result of the judgment, if the fast-forwarding/rewinding processing is not ended (the step S706: No), the operational flow goes to the step S702 again, and it is judged whether or not there is the command input for fast-forwarding.

On the other hand, if the fast-forwarding/rewinding processing is ended (the step S706: Yes), the divisional unit number and the divisional unit address of the divisional unit including the address (i.e. the address of the TS packet constituting the currently reproduced I picture at the time point when the user ends the operation) are obtained (step S707). Then, the fast-forwarding/rewinding processing is ended, and the operational flow goes to the step S404 in FIG. 27 to continue the reproduction processing.

This is how to complete the fast-forwarding/rewinding processing.

(Access Flow on Reproduction)

Figure 27:
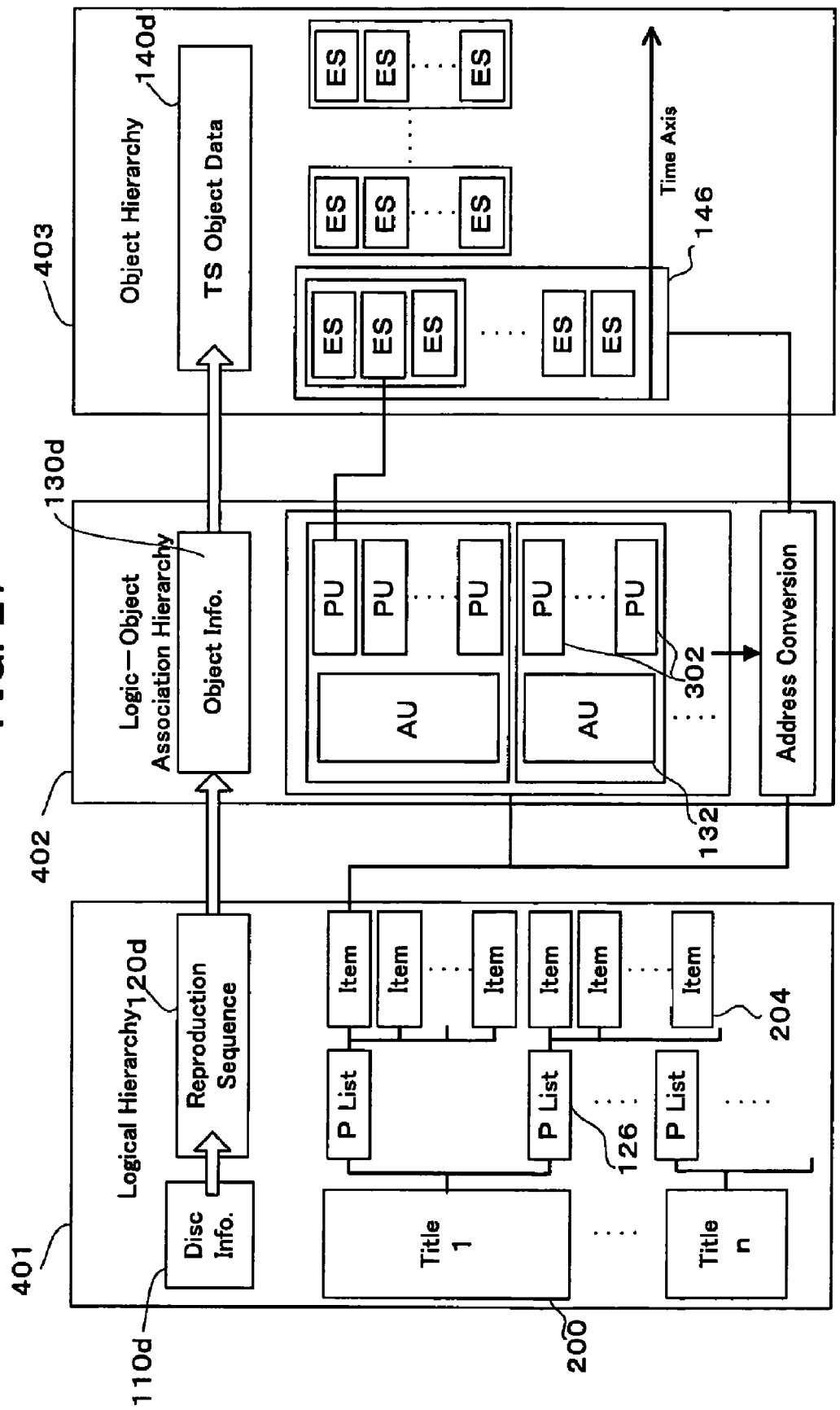
FIG. 27 is a view conceptually illustrating an entire access flow during reproduction in the embodiment, showing in association with the logical structure of the optical disc.

Next, with reference to FIG. 27, the access flow on reproduction by the information recording/reproducing apparatus 500, employing the AU information 132 and the PU information 302, is explained as one of the features of this embodiment, with the logical structure of the optical disc 100. FIG. 27 schematically illustrates an entire access flow on reproduction, in relation to the logical structure of the optical disc 100.

In FIG. 27, the logical structure of the optical disc 100 is categorized roughly into the following three hierarchies: a logical hierarchy 401; an object hierarchy 403; and a logic-object association hierarchy 402 mutually associating those two hierarchies.

Among them, the logical hierarchy 401 is a hierarchy for logically specifying various logical information to reproduce the desired title during the reproduction, the play list (P list) to be reproduced and its constitutional contents. In the logical hierarchy 401, disc information 110d indicating the entire titles 200 and the like on the optical disc 100 is written within the disc information file 110 (see FIG. 3), and further, reproduction sequence information 120d of the entire contents on the optical disc 100 is written within the play list information file 120 (see FIG. 3). More specifically, as the reproduction sequence information 120d, the structure of one or more play lists 126 is written in each title 200 and the structure of one or more Items 204 is written in each play list 126. Then, at the time of the access during the reproduction, the logical hierarchy 401 as described above specifies the title 200 to be reproduced, the play list 126 corresponding to this, and further the item 204 corresponding to this.

Next, the logic-object association hierarchy 402 is a hierarchy for specifying the attribute and the physical storage address of the TS object data 140d to be reproduced, so as to specify the combination and/or the construction of the TS object data 140d as the entity data and perform an address conversion to the object hierarchy 403 from the logical hierarchy 401, on the basis of the information specified in the logical hierarchy 401 as described above. More specifically, in the logic-object association hierarchy 402, the object information data 130d, which separates a group of the contents constituting each item 204 into units of the AU 132 and which finely separates each AU 132 into units of the PU 302, is written in the object information file 130 (see FIG. 3).

Here, the "PU 302" corresponds to the group of one or more elementary streams, each constituting the content which consists of the video information, the audio information and the sub-picture information and which is related to one stream group, out of the plurality of stream groups which can be changed and reproduced mutually by the user's operation upon the reproduction. The AU 132 is made of the group of the plurality of PUs which can be changed mutually. Therefore, if the AU 132 to be reproduced is specified, and furthermore if the PU 302 is specified, then, the elementary stream to be reproduced is specified. Namely, even without using the PAT and PMT shown in FIG. 6, it is possible to reproduce the desired elementary stream from among those multiplexed and recorded on the optical disc 100. Thus, in the logic-object association hierarchy 402, an address conversion is performed from a logical address relating to each item 204 to a physical address relating to each PU 302.

Next, the object hierarchy 403 is a physical hierarchy to reproduce the actual TS object data 140d. In the object hierarchy 403, the TS object data 140d is written within the object data file 140 (see FIG. 3). Then, a plurality of TS packets multiplexed at each time point are associated with a PU 302 identified by the logic-object association hierarchy 402, for each elementary stream.

Incidentally, in the embodiment, the TS object data 140d is recorded by the divisional unit, for each stream group, and is associated with the PU 302 identified by the logic-object association hierarchy 402, for each elementary stream constituting each stream group.

Thus, in the object hierarchy 403, the object data is actually reproduced, using the physical address obtained from the conversion in the logic-object association hierarchy 402.

As described above, the three hierarchies shown in FIG. 27 allow making an access to the optical disc 100 during the reproduction.

As explained in detail with reference to FIG. 1 to FIG. 27, according to this embodiment, it looks from a user's side as if it is possible to perform the multiplex recording and synchronous reproduction of a plurality of video streams, even on the optical disc having a restriction of the single video stream, such as a conventional DVD, by reconstructing the original data compliant with the transport stream format as the stream group compliant with the single video stream format and by recording it by the divisional unit. Moreover, it is possible to change and reproduce video, as occasion demands, by selectively reproducing the divisional unit related to the predetermined stream group, by the user's operation, for example. In particular, by recording the stream group corresponding to the angle change, it is possible to perform the seamless or non-seamless angle change and angle reproduction, relatively easily.

Incidentally, in the aforementioned embodiment, the explanation is made on the optical disc 100 as an example of the information recording medium and the recorder or player of the optical disc 100 as an example of the information recording/reproducing apparatus. Nevertheless, the present invention is not limited to the optical disc and the player or recorder thereof, but is applicable to other various information recording media and the recorders or players thereof, supporting high density recording or high transfer rate.

Moreover, the above-mentioned video change is not limited to the angle change, for example, however, it may realize "parental reproduction" or the like, for reproducing a scene or cut corresponding to a parental level given to the content in advance, such as Rated-R 18 and Rated R-15.

The present invention is not limited to the above-described embodiment, and various changes may be made, if desired, without departing from the essence or spirit of the invention which can be read from the claims and the entire specification. An information recording medium, an apparatus for and a method of recording the information, an apparatus for and a method of reproducing the information, an apparatus for and a method of recording and reproducing the information, a computer program for controlling the record or the reproduction, and a data structure including a control signal, all of which involve such changes, are also intended to be within the technical scope of the present invention.

INDUSTRIAL APPLICABILITY

An information recording medium, an apparatus for and a method of recording the information, an apparatus for and a method of reproducing the information, an apparatus for and a method of recording and reproducing the information, a computer program for controlling the record or the reproduction, and a data structure including a control signal, all of which are according to the present invention, can be applied to a high-density optical disc for consumer or industrial use, such as a DVD, on which various information, such as the video information, the audio information and the sub-picture information, can be recorded at high density and further can be applied to a DVD player, a DVD recorder, and the like. Moreover, they can be applied to an information recording medium, an information recording/reproducing apparatus, or the like, which are mounted on or can be connected to various computer equipment for consumer or industrial use, for example.

The invention claimed is:

1. An information recording medium, which is a non-transitory medium, on which there are recorded in a non-transitory state, comprising:
   an object data file for storing object data which includes a plurality of portion stream including at least one video stream and is comprised by a plurality of packets;
   an object information file for storing correspondence definition information for defining a correspondence relationship between the plurality of portion streams and the plurality of packets; and
   control information including angle presence/absence information which indicates whether or not the object data includes a plurality of angles,
   wherein, when the angle presence/absence information indicates that the object data includes the plurality of angles, (i) the object data includes the plurality of angles which can be selectively switchably-reproduced, (ii) the plurality of angles is constructed such that reproduction can be switched from first switchable position in one angle to second switchable position in other angle during a reproduction of the one angle, and (iii) the object information file further storing switchable address information which indicates an address of each of the first switchable position and the second switchable position, and each of the object data file, the object information file and the control information is recorded into a different area, respectively.

2. The information recording medium according to claim 1, wherein each of the plurality of portion streams are portion streams which includes at least one of a sub-picture stream including sub-picture information and an audio stream including audio information, and which mutually performs an angle change with the video stream.

3. The information recording medium according to claim 2, wherein the switchable position is set in the object data.

4. The information recording medium according to claim 1, wherein the switchable address information includes an address of each of the switchable positions.

5. The information recording medium according to claim 1, wherein the switchable address information indicates an address of the object data in an address table in said object information file, and the correspondence definition information is stored in said object information file, as a correspondence definition information table.

6. The information recording medium according to claim 1, wherein the correspondence definition information includes:
   portion stream packet identification information for identifying each of the plurality of packets for each of the portion streams; and
   portion stream address information for indicating an address of each packet for each of the portion streams, with respect to at least one portion of the packets.

7. The information recording medium according to claim 6, wherein the portion stream address information includes packet address information for indicating an address of each packet in a format corresponding to each reproduction start time point, for each of the portion streams, with respect to at least one portion of the packets.

8. An information reproducing apparatus for reproducing a recorded content information from the information recording medium according to claim 1, said information reproducing apparatus comprising:
   a reading device for reading information from the information recording medium; and
   a reproducing device for reproducing the object data, on the basis of the object information file and the control information.

9. An information recording apparatus, comprising:
   an optical pickup that emits laser light to record data onto an information recording medium; and
   a system controller that controls an operation of the optical pickup (i) so as to record an object data file for storing object data which includes a plurality of portion stream including at least one video stream and is comprised by a plurality of packets; (ii) so as to record an object information file for storing correspondence definition information for defining a correspondence relationship between the plurality of portion streams and the plurality of packets; and (iii) so as to record control information including angle presence/absence information which indicates whether or not the object data includes a plurality of angles, wherein, when the angle presence/absence information indicates that the object data includes the plurality of angles, (i) the object data includes the plurality of angles which can be selectively switchably-reproduced, (ii) the plurality of angles is constructed such that reproduction can be switched from first switchable position in one angle to second switchable position in other angle during a reproduction of the one angle, and (iii) the object information file further storing switchable address information which indicates an address of each of the first switchable position and the second switchable position, and each of the object data file, the object information file and the control information is recorded into a different area, respectively.

* * * * *